US012755261B2

(12) United States Patent
Minaei Bidgoli et al.

(10) Patent No.: US 12,755,261 B2
(45) **Date of Patent: *Oct. 6, 2026**

(54) UNIVERSAL PAYMENT CHANNEL

(71) Applicant: Visa International Service Association, San Francisco, CA (US)

(72) Inventors: Mohammad Mohsen Minaei Bidgoli, San Jose, CA (US); Ranjit Kumaresan, Fremont, CA (US); Srinivasan Raghuraman, Cambridge, MA (US); Mahdi Zamani, Mercer Island, WA (US); Arjuna Wijeyekoon, Millbrae, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/468,536

(22) Filed: Feb. 3, 2026

(65) Prior Publication Data

US 2026/0179065 A1 Jun. 25, 2026

Related U.S. Application Data

(63) Continuation of application No. 18/549,430, filed as application No. PCT/US2022/019927 on Mar. 11, 2022, now Pat. No. 12,572,907.

(Continued)

(51) Int. Cl.
*G06Q 20/10* (2012.01)
*G06Q 20/06* (2012.01)
(Continued)

(52) U.S. Cl.
CPC ........... *G06Q 20/10* (2013.01); *G06Q 20/065* (2013.01); *G06Q 20/38215* (2013.01);
(Continued)

(58) Field of Classification Search
None
See application file for complete search history.

(56) References Cited

U.S. PATENT DOCUMENTS 11,501,370 B1 * 11/2022 Paya ..................... H04L 9/0819
2019/0303807 A1 * 10/2019 Gueye .................... G06Q 10/02
(Continued)

FOREIGN PATENT DOCUMENTS

AU 2019261819 A1 * 12/2019 ........... G06Q 20/385
WO 2021046494 A1 3/2021

OTHER PUBLICATIONS

Tian, H., et al. "Enabling Cross-chain Transactions: A Decentralized Cryptocurrency Exchange Protocol", arXiv:2005.03199v1 [cs.CR] May 7, 2020. (Year: 2020).*

(Continued)

*Primary Examiner* — Clay C Lee
(74) *Attorney, Agent, or Firm* — Kilpatrick Townsend & Stockton LLP

(57) ABSTRACT

A method is disclosed. The method includes A method is disclosed. The method can include receiving, by a hub computer, a first user account identifier from a first service provider computer in communication with a first user device, and also in communication with a first blockchain network. The first service provider computer can transfer an amount of digital currency to a first smart contract on the first blockchain network. The hub computer can also receive a second user account identifier from a second service provider computer in communication with a second user device, and also a second blockchain network containing a second smart contract. The hub computer may receive a first amount of a first digital currency from the first service (Continued)

provider computer, and may then transfer a second amount of a second digital currency to the second service provider computer.

20 Claims, 15 Drawing Sheets

Related U.S. Application Data

(60) Provisional application No. 63/167,489, filed on Mar. 29, 2021, provisional application No. 63/159,933, filed on Mar. 11, 2021.

(51) Int. Cl.
*G06Q 20/38* (2012.01)
*G06Q 20/40* (2012.01)

(52) U.S. Cl.
CPC ....... *G06Q 20/3827* (2013.01); *G06Q 20/389* (2013.01); *G06Q 20/4014* (2013.01)

(56) References Cited

U.S. PATENT DOCUMENTS

| | | | | |
|---|---|---|---|---|
| 2020/0382480 | A1* | 12/2020 | Isaacson | G06Q 20/384 |
| 2021/0019737 | A1* | 1/2021 | Vladi | G06Q 20/02 |
| 2022/0253842 | A1* | 8/2022 | James | H04L 9/50 |

OTHER PUBLICATIONS

U.S. Appl. No. 18/549,430 , Non-Final Office Action, Mailed On Apr. 10, 2025, 28 pages.

U.S. Appl. No. 18/549,430 , Notice of Allowance, Mailed On Nov. 4, 2025, 22 pages.

Tian et al., “Enabling Cross-chain Transactions: A Decentralized Cryptocurrency Exchange Protocol”, arxiv, Available Online at: https://arxiv.org/pdf/2005.03199, May 7, 2020, 18 pages.

U.S. Appl. No. 18/549,430 , “Corrected Notice of Allowability”, Feb. 5, 2026, 2 pages.

* cited by examiner

SMART CONTRACT
200

Init(cid, vk1, vk2, T):

1. Set channelID ← cid, $vk_S$ ← $vk_1$, $vk_C$ ← $vk_2$, disputeTime ← T
2. Set status ← "Active", finalidx ← 0, finalCredit ← 0, serverDeposit ← 0, clientDeposit ← 0, channelExpiry ← 0, closeRequestor ← ⊥

GetParams():

Output[channelID, $vk_S$, $vk_C$, disputeTime]

GetState():

Output[status, finalidx, finalCredit, serverDeposit, clientDeposit, channelExpiry, closeRequestor]

Deposit(amount):

1. Abort is status "Active"
2. Abort if caller.vk ≠ $vk_S$ and caller.vk ≠ $vk_C$
3. If caller.vk = $vk_S$, then set serverDeposit ← serverDeposit + amount
4. If caller.vk = $vk_C$, then set clientDeposit ← clientDeposit + amount

InitClose():

1. Abort if status ∈ {CooperativeClosing, Closed}
2. If status = "Active", then channelExpiry ← currentTime + disputeTime, status ← "UnilateralClosing" and close Requester ← caller.vk
3. If status = "UnilateralClosing" and caller.vk ← closeRequester, then set status ← "CooperativeClosing"

Withdraw():

1. Abort if status ∈ {Active, Closed}
2. Abort if status = "Active" and currentTime > channelExpiry
3. Invoke $vk_C$.transfer(clientDeposit + finalCredit) and $vk_S$.transfer(serverDeposit – finalCredit)
4. Set status ← "Closed"

Claim(cid, idx, clientCredit, txAmount, hash, expiry, secretReceived, σ, secret):

1. Abort if idx ≤ finalidx
2. If secretReceived = 0, abort if currentTime > Expiry or if Hash(secret) ≠ hash
3. If caller.vk = $vk_S$:
   (a) Abort if SigVerify([channelID, idx, clientCredit, txAmount, hash, expiry, secretReceived, σ, $vk_C$) ≠ 1], , $vk_C$) ≠ 1
   (b) Abort if txAmount > clientDeposit + clientCredit
   (c) Update finalCredit ← clientCredit – txAmount
4. Update finalidx ← idx
5. Invoke InitClose()

FIG. 2

HELPER FUNCTIONS
300

CreatePromise(cid, state, txAmount, hash, expiry, sk):
1. Set secretReceived ← 0
2. Output [cid, idx, clientCredit, txAmount, hash, expiry, secretReceived, σ], where σ = Sign[cid, idx, clientCredit, txAmount, hash, expiry, secretReceived]

VerifyPromise(promise, cid, state, txAmount, hash, expiry, vk):
1. Set secretReceived ← 0
2. Output SigVerify(promise.σ, [cid, idx, clientCredit, txAmount, hash, expiry, secretReceived], vk)

CreateReceipt(cid, state, sk):
1. Set txAmount ← ⊥, hash ← ⊥, expiry ← ⊥, secretReceived ← 1
2. Output [cid, idx, clientCredit, txAmount, hash, expiry, secretReceived, σ], where σ = Sign[cid, idx, clientCredit, txAmount, hash, expiry, secretReceived]

VerifyReceipt(receipt, cid, state, vk):
1. Set txAmount ← ⊥, hash ← ⊥, expiry ← ⊥, secretReceived ← 1
2. Output SigVerify(receipt.σ, [cid, idx, clientCredit, txAmount, hash, expiry, secretReceived], vk)

UpdateLocalState(localState, promise, increaseCredit):
1. localState.idx ← localState.idx + 1
2. If increaseCredit = 1, then localState.clientCredit ← localState.clientCredit + promise.txAmount
3. Otherwise, localState.clientCredit ← localState.clientCredit – promise.txAmount
4. Output localState

FIG. 3

CONTRACT AND TIME EVENT HANDLER
400

While TRUE:
For each channel C in party's list of channels:
1. C.contractState ← C.contract.GetState()
2. If C.contractState.status = "Closed"
    a) C ← ⊥ and return [ChannelClosed]
3. If C.contractState.status = "CooperativeClosing"
    a) Invoke C.contract.Withdraw()
4. If C.contractState.status = "UnilateralClosing"
    a) If C.promise.secret ≠ ⊥, then invoke C.contract.Claim(C.promise)
    b) Otherwise, if C.receipt ≠ ⊥, then invoke C.contract.Claim(C.receipt)
    c) If C.receipt = ⊥ and C.promise.secret = ⊥, then invoke C.contract.InitClose()
    d) If currentTime > C.contractState.channelExpiry, then invoke C.contract.Withdraw()
5. If C.contractState.status = "Active" and currentTime > C.contractState.promise.expiry
    a) If C.promise.secret ≠ ⊥, then invoke C.contract.Claim(C.promise)
    b) Set C.promise ← ⊥

FIG. 4

AUTHORIZE PROTOCOL
800

Party A initiates transfer to Party B. Party A and B agree on: (hash, txAmount, txExpiry), where Party B knows secret such that hash = Hash(secret)

1. Party A:

a) $P_A \leftarrow$ CreatePromise($cid_A$, $C_A$.localstate, txAmount, hash, txExpiry + $ledger_A.\Delta$, $sk_A$)

b) Set $C_A$.promise $\leftarrow P_A$ c) Transmit SenderPromise[$P_A$, B] to Server S

2. Server S:

a) Set $C_{S,A}$.promise $\leftarrow P_A$ b) $P_S \leftarrow$ CreatePromise($cid_B$, $C_{S,B}$.localState, $P_A$.txAmount, $P_A$.hash, $P_A$.expiry – $ledger_A.\Delta$, $sk_S$)

c) Set $C_{S,B}$.promise $\leftarrow P_S$ d) Transmit ServerPromise[$P_S$] to Party B

3. Party B a) Set $C_B$.promise $\leftarrow P_S$ b) Set $C_B$.promise.secret $\leftarrow$ secret

FIG. 8

TRANSFER PROTOCOL
1000

1. Party B:

a) $C_B$.localState ← UpdateLocalState($C_B$.localState, $C_B$.promise, 1)

b) $C_B$.promise.secret ← secret c) Transmit [secret, A] to Server S

2. Server S:

a) $C_{S,B}$.localState ← UpdateLocalState($C_{S,B}$.localState, $C_{S,B}$.promise, 1)

b) $receipt_S$ ← CreateReceipt($cid_B$, $C_{S,B}$.localState, $sk_S$)

c) $C_{S,B}$.promise ← ⊥ d) Transmit ReceiverReceipt[receiptS] to Party B e) $C_{S,A}$.localState ← UpdateLocalState($C_{S,A}$.localState, $C_{S,A}$.promise, 0)

f) $C_{S,A}$.promise.secret ← secret g) Transmit [secret] to Party A

3. Party A a) localState ← UpdateLocalState($C_A$.localState, $C_A$.promise, 0)

b) $receipt_A$ ← CreateReceipt($cid_A$, $C_A$.localState, $sk_A$)

c) $C_A$.promise ← ⊥ d) Transmit ServerReceipt[$receipt_A$] to Server S

4. Server S

$C_{S,A}$.promise ← ⊥ , $C_{S,A}$.receipt ← $receipt_A$

5. Party B

$C_B$.promise ← ⊥, $C_B$.receipt ← $receipt_S$

FIG. 10

UNIVERSAL PAYMENT CHANNEL

CROSS-REFERENCES TO RELATED APPLICATIONS

This application is a continuation application of U.S. patent application Ser. No. 18/549,430, filed on Sep. 7, 2023, which is a National Stage of International Application No. PCT/US2022/019927, filed Mar. 11, 2022, which claims priority to and the benefit of U.S. Provisional Patent Application No. 63/159,933, filed on Mar. 11, 2021, and U.S. Provisional Patent Application No. 63/167,489, filed on Mar. 29, 2021, which are herein incorporated by reference.

BACKGROUND

Blockchain technologies that facilitate cryptocurrencies are used today. However, the number of cryptocurrencies that exist are numerous. There is often no easy way to allow two users that use different types of cryptocurrencies to pay each other in a transaction.

Further, blockchains often require users to be connected to a blockchain to transfer cryptocurrencies to other users. The online transfer may be cumbersome to perform. For example, for a pair of users conducting many micro-transfers, the speed of the transfer can be inconvenient, as all transfers must be added to the blockchain network.

Embodiments of the disclosure address this problem and other problems individually and collectively.

SUMMARY

One embodiment of the invention includes a method. The method comprises: receiving, by a hub computer, a first user account identifier from a first service provider computer in communication with a first user device, and in communication with a first blockchain network, the first service provider computer thereafter transferring an amount of a first digital currency to a first smart contract on the first blockchain network; receiving, by the hub computer, a second user account identifier from a second service provider computer in communication with a second user device, and also a second blockchain network containing a second smart contract, wherein the hub computer is separately in communication with the first blockchain network and the second blockchain network, and the hub computer is in communication with the first service provider computer via a first interaction channel and the hub computer is in communication with the second service provider computer via a second interaction channel; receiving, by the hub computer, a first amount of the first digital currency from the first service provider computer via the first interaction channel; and transferring, by the hub computer, a second amount of a second digital currency to the second service provider computer via the second interaction channel.

A hub computer is disclosed. The hub computer comprises: a processor; and a non-transitory computer readable medium comprising instructions executable by the processor to perform operations including: receiving, by a hub computer, a first user account identifier from a first service provider computer in communication with a first user device, and in communication with a first blockchain network, the first service provider computer thereafter transferring an amount of a first digital currency to a first smart contract on the first blockchain network; receiving, by the hub computer, a second user account identifier from a second service provider computer in communication with a second user device, and also a second blockchain network containing a second smart contract, wherein the hub computer is separately in communication with the first blockchain network and the second blockchain network, and the hub computer is in communication with the first service provider computer via a first interaction channel and the hub computer is in communication with the second service provider computer via a second interaction channel; receiving, by the hub computer, a first amount of the first digital currency from the first service provider computer via the first interaction channel; and transferring, by the hub computer, a second amount of a second digital currency to the second service provider computer via the second interaction channel.

Another method is disclosed. The method comprises: generating, by a first service provider computer, a sender promise comprising a first amount of a first digital currency and first parameters, wherein the first parameters include a hashed secret of an interaction proposal; transmitting, by the first service provider computer to a hub computer through a first interaction channel, the sender promise, wherein the hub computer thereafter generates a server promise comprising a second amount of a second digital currency and transmit the server promise to a second service provider computer; receiving, by the first service provider computer from the hub computer, the secret of the hashed secret, wherein the first user device verifies the secret by hashing the secret and comparing the hashed secret to the previously received hashed secret; generating, by the first service provider computer, a server receipt comprising first parameters of the first smart contract; and transmitting, by the first service provider computer to the hub computer, the server receipt.

A better understanding of the nature and advantages of embodiments of the invention may be gained with reference to the following detailed description and accompanying drawings.

BRIEF DESCRIPTION OF THE DRAWINGS

FIG. 2 shows pseudocode for a smart contract according to embodiments.

FIG. 3 shows pseudocode for helper functions of a smart contract according to embodiments.

FIG. 4 shows pseudocode for a contract and time event handler of a smart contract according embodiments.

FIG. 8 shows pseudocode for a authorize protocol according to embodiments.

FIG. 10 shows pseudocode for a transfer protocol according to embodiments.

DETAILED DESCRIPTION

Figure 1:
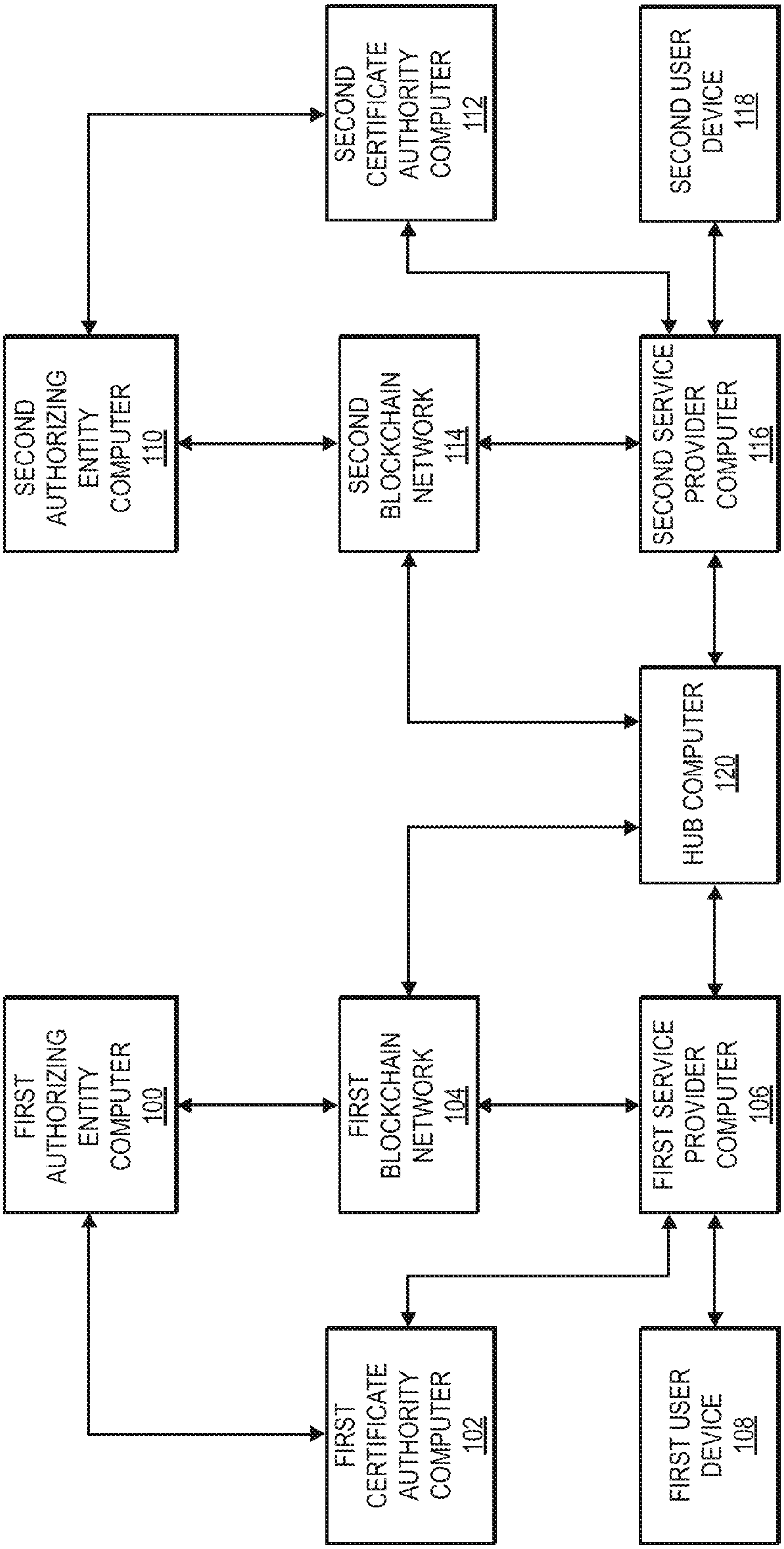
FIG. 1 shows a block diagram of a universal interaction system according to embodiments.

Prior to discussing embodiments of the disclosure, some terms can be described in further detail.

A "user" may include an individual. In some embodiments, a user may be associated with one or more personal accounts and/or mobile devices.

A "user device" may be a device that is operated by a user. Examples of user devices may include a mobile phone, a smart phone, a card, a personal digital assistant (PDA), a laptop computer, a desktop computer, a server computer, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. A user device may also be a credit, debit, or prepaid card.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

A "digital wallet" may include an electronic device or service that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card. Digital wallets may also be used manage cryptocurrencies and execute cryptocurrency transactions, including, for example, receiving cryptocurrencies at a cryptocurrency address associated with the digital wallet holder or transmitting cryptocurrencies to other cryptocurrency addresses.

A "key pair" may include a pair of linked cryptographic keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature generated with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a public key of a public/private key pair may be a used as an entity identifier that identifies an entity on a blockchain. For example, a first user account identifier may identify a digital currency account of a first user on a blockchain. A first service provider identifier may identify a first service provider, or a first service provider computer.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

A "digital signature" may include an electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature. A digital signature may be used to demonstrate the veracity of the sender.

A "hash" or "hash value" may include any data element produced using a "hashing function." A hashing function may be used to transform data of arbitrary size to data of fixed size (for example, 1 KB). A hash function may be used to generate commitments to secret data, such as a secret token, without revealing the secret data itself. Some hash functions are "collision resistant," meaning it is difficult to determine two inputs that produce the same hash output. Collision resistant hash functions can be used as a security feature in blockchains.

A "blockchain" may include a database that maintains a continuously-growing list of records secured from tampering and revision. A blockchain may include a number of blocks of event records recorded by one or more peers. Each block in the blockchain can contain also include a timestamp and a link to a previous block. For example, each block may include a hash of the previous block. Stated differently, event records in a blockchain may be stored as a series of "blocks," or permanent files that include a record of a number of events occurring over a given period of time. Blocks may be appended to a blockchain by an appropriate peer after it completes the block and the block is validated. In embodiments of the invention, a blockchain may be distributed, and a copy of the blockchain may be maintained at each peer in a blockchain network.

A "node" of a blockchain may include a computer or software node. In some cases, each node in a blockchain network has a copy of a digital ledger or blockchain. Each node checks the validity of each transaction. In some cases, if a majority of nodes say that a transaction is valid then it is written into a block.

An "off-chain channel" or "interaction channel" may include a channel used to perform cryptocurrency transactions or micro-transactions without broadcasting to the underlying blockchain. An off-chain channel may be referred to as a "layer two channel." Channels in the Lightning Network are examples of off-chain channels. In some implementations, an off-chain channel may be implemented by deploying a smart contract to the blockchain. The participants on the off-chain channel can then perform cryptocurrency transactions with one another without broadcasting to the blockchain. The off-chain channel can be closed by broadcasting "closing," at which point the funds on the off-chain channel are distributed to the participants.

A "memory" may include any suitable device or devices that may store electronic data. A suitable memory may comprise a non-transitory computer readable medium that stores instructions that can be executed by a processor to implement a desired method. Examples of memories include one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xenon, and/or XScale; and/or the like processor(s).

FIG. 1 shows a block diagram of a universal interaction system according to embodiments. The universal interaction system can comprise a first authorizing entity computer 100, a first certificate authority computer 102, a first blockchain network 104, a first service provider computer 106, a first user device 108, a second authorizing entity computer 110, second certificate authority computer 112, a second blockchain network 114, a second service provider computer 116, a second user device 118, and a hub computer 120.

The first authorizing entity computer 100 and the second authorizing entity computer 110 can be operated by a first authorizing entity and a second authorizing entity respectively. In some embodiments, in the environment of cross-border transactions, the first authorizing entity may be a central bank of a first country (e.g., the United States), while the second authorizing entity can be a central bank of another country (e.g., the United Kingdom).

The first certificate authority computer 102 and the second certificate authority computer 112 can be operated by the same or different certificate authorities. In some embodiments, the first certificate authority computer 102 and the second certificate authority computer 110 can be computers that are operated by banks, payment processors, or other entities that would be under the authority of the first and second authorizing entities, respectively.

The first blockchain network 104 may operate a first blockchain of a first digital currency. The second blockchain network 114 may operate a second blockchain of a second digital currency. The first and second digital currencies may be the same or different. In some embodiments, the first blockchain network 104 may be operated or used by the first authority entity, and the second blockchain network 114 may be operated or used by the second authorizing entity.

The first service provider computer 106 may be operated by a first service provider. The first service provider may provide access to a digital wallet to users. For example, the first service provider computer 106 may be a digital wallet application server and may communicate with digital wallet applications installed on user devices. The second service provider computer 116 may be operated by a second service provider, and may be similar to the first service provider computer 106. The first user device 108 may be operated by a first user, and the second user device 118 may be operated by a second user. The hub computer 120 may be operated by a processing network, such as a payment processing network.

The components in the universal interaction system of FIG. 1 and any of the following figures can be in operative communication with each other through any suitable communications medium. Suitable examples of the communications medium may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices of FIG. 1 may be transmitted using a secure communications protocol such as, but not limited to, File Transfer Protocol (FTP); HyperText Transfer Protocol (HTTP); and Secure Hypertext Transfer Protocol (HTTPS).

The first authorizing entity computer 100 can manage access to the first digital currency, which can be a central bank digital currency (CBDC). For example, the first authorizing entity computer 100 may delegate key provisioning authority to the first certificate authority computer 102. In some embodiments, the first certificate authority computer 102 may provide a key pair (e.g., through a digital certificate) used to access to the first blockchain network 104 to a service provider computer such as a the first service provider computer 106. The first service provider computer 106 may then access or interact with the first blockchain network 104 using a received public key of a key pair. The public key may be used as a first service provider identifier that identifies the first service provider. The first service provider identifier can allow the first service provider computer 106 to issue accounts on the first blockchain network 104. For example, the first service provider computer 106 may issue an account on the first blockchain network 104 to the first user operating the first user device 108. The first user's account may be identified by a first user account identifier (e.g., a public key of the first user device 108 used as an address of an account on the first blockchain network 104). Other first service provider identifiers including alphanumeric identifiers assigned to the first service provider can alternatively be used.

Once the first service provider computer 106 receives the key pair from the first certificate authority computer 102, the first service provider computer 106 may then provide digital currency accounts to user devices. For example, the first service provider computer 106 can provide a digital currency account to the first user device 108 by provisioning the first user device 108 with a first user public key. For example, the first user may install a digital wallet application on the first user device 108 which then provides the first user device 108 with a first user public key acting as a first user account identifier used to access a digital currency account on the first blockchain network 104. After obtaining the digital currency account, the first user device 108 may communicate with the first blockchain network 104 via the first service provider computer 106. The first service provider computer 106 may open a collateral channel with the hub computer 120 on the first blockchain network 104. The collateral channel may be used by the first user, via the first service provider computer 106, and the hub computer 120 to deposit first digital currency into a smart contract deployed on the first blockchain network 104. After some amount of the first digital currency has been deposited to the smart contract by both the first user device 108, via the first service provider computer 106, and the hub computer, an interaction channel can be established. The interaction channel may allow the first service provider computer 106 to communicate and perform interactions (e.g., off-chain and cross-chain transfers) on behalf of the first user device 106 directly with the hub computer 120, without accessing the first blockchain network 104.

A similar process can be performed between the second authorizing entity computer 110, the second certificate authority computer 112 (e.g., to provide a public key that acts as a second service provider identifier), the second blockchain network 114, the second service provider computer 116, the second user device 118, and the hub computer 120 to establish an interaction channel between the second service provider computer 116 and the hub computer 120. After the interaction channel is established between the second service provider computer 116 and the hub computer 120, the hub computer 120 may be separately in communication with the first blockchain network 104 and the second blockchain network 114, and the first service provider computer 106 via a first interaction channel and the second service provider computer 116 via a second interaction channel. The second service provider computer 116 may provide the second user a digital currency account on the second blockchain network 114, identified by the second user account identifier (e.g., a public key of the second user device 118).

FIG. 2 shows pseudocode for a smart contract 200 according to embodiments. The smart contract 200 may comprise a plurality of contract functions and protocols including an initialize function, a get parameters function, a get state function, a deposit function, an initialize close function, a withdraw protocol, and a claim protocol. The smart contract 200 may be used to implement an interaction channel. The smart contract 200 may be stored on a blockchain, a hub computer, and/or service provider computers.

An exemplary initialize function is shown in the smart contract 200. The initialize function may deploy and initiate the smart contract 200 to a blockchain network. The initialize function, denoted by Init(cid, $vk_1$, $vk_2$, T), may take as input a channel identifier, cid, a first public key, $vk_1$, a second public key, $vk_2$, and a time period, T.

At line 1 of the initialize function, the channel identifier, cid, may be set to a channel identifier variable, channelID, may be string (e.g., a randomly generated string, a string generated according to some predetermined method, etc.) that identifies the interaction channel established by the smart contract 200. The first public key, $vk_1$, may be set to a server public key variable, $vk_S$, which can be a public key of a server computer. The second public key, $vk_2$, may be set to a client public key variable, $vk_C$, which can be a public key of a client (e.g., the first user or the second user). The time period, T, may be set to a disputeTime variable, which can be a time after which the interaction channel expires upon initializing closing of a channel. For example, the first public key, $vk_1$, may be a public key of the hub computer 120, and the second public key, $vk_2$, may be the public key of the first user device provisioned by the first service provider computer 106 (e.g., the first user account identifier), and the time, T, can be one hour.

At line 2 of the initialize function, after the inputs are set to the placeholder variables, the initialize function may then set a contract status variable of the interaction channel to an active status, Active, and can initialize several other variables. For example, a final index variable, finalidx, a final credit variable, finalCredit, a server deposit variable, serverDeposit, a client deposit variable, clientDeposit, a channel expiry variable, channelExpiry, and a close requestor variable, closeRequestor, can be set to zero or null. The final index variable, finalidx, may be a counter that keeps count of the number of interactions performed using the interaction channel. The final credit variable, finalCredit, may be a variable that tracks the amount of digital currency moved using the interaction channel (e.g., a positive value if the client gains digital currency, or negative if the client transfers digital currency). The server deposit variable, serverDeposit, may be a variable that tracks the amount of digital currency initially deposited by the hub computer 120 to the smart contract 200 (e.g., via a collateral channel). The client deposit variable, clientDeposit, may be a variable that tracks the amount of digital currency initially deposited by a service provider computer (e.g., the first service provider computer 106 or the second service provider computer 116) to the smart contract 200 (e.g., via a collateral channel). The channel expiry variable, channelExpiry, may be a variable that determines when the interaction channel will expire. The close requestor variable, closeRequestor, may be a variable that identifies a party that initializes closing of the interaction channel.

An exemplary get parameters function is shown in the smart contract 200. The get parameters function may retrieve several parameters of the interaction channel. The get parameters function, denoted by GetParams( ), can retrieve the channel identifier, channelID, the server public key, $vk_S$, the client public key, $vk_C$, and the dispute time, disputeTime, of a interaction channel.

An exemplary get state function is shown in the smart contract 200. The get state function may retrieve the state of the interaction channel. The get state function, denoted by GetState( ), can retrieve the status of the interaction channel, status, the final index variable, finalidx, the final credit variable, finalCredit, the server deposit variable, serverDeposit, the client deposit variable, clientDeposit, the channel expiry variable, channelExpiry, and the close requestor variable, closeRequestor, of the first smart contract.

An exemplary deposit function is shown in the smart contract 200. The deposit function may be used to deposit digital currency to the smart contract 200. That is, the deposit function can initiate the transfer of digital currency from the blockchain accounts of the entities involved in the smart contract 200 to the smart contract 200 upon opening of the interaction channel. The deposit function, denoted by Deposit(amount), may take as input an amount of digital currency, "amount."

At lines 1 and 2 of the deposit function, the deposit function may first perform several verification checks. For example, the deposit function may first check if the interaction channel established by the smart contract 200 is active, and it may additionally check if the party calling the deposit function is an authorized user of the interaction channel by checking if the public key of the calling party, caller.vk, is equal to either the server public key, $vk_S$, or the client public key, $vk_C$.

At lines 3 and 4 of the deposit function, the deposit function may then determine the identity of the calling party. If the public key of the calling party, caller.vk, is equal to the server public key, $vk_S$, the amount may be added to the server deposit variable. If the public key of the calling party, caller.vk, is equal to the client public key, $vk_C$, the amount may be added to the client deposit variable.

An exemplary initialize close function, denoted by InitClose( ), is shown in the smart contract 200. The initialize close function may be used to initialize closing of the interaction channel.

At line 1 of the initialize close function, the initialize close function may first perform several verification checks. For example, the initialize close function can first check if the interaction channel is already closed, or cooperatively closed.

At line 2 of the initialize close function, the initialize close function may then determine if the interaction channel is active. If the contract status variable of the interaction channel is an active status, Active, then the initialize close function may set the channel expiry variable, channelExpiry, to the dispute time (e.g., by adding the dispute time variable to a timestamp, currentTime, of when the initialize close function was called). The initialize close function may then set the contract status variable to equal a unilateral closing status, UnilateralClosing, meaning one of the two parties has initialized closing of the interaction channel, and set the close requestor variable to the public key of the calling party.

At line 3, if the contract status variable of the interaction channel is a unilateral closing status, UnilateralClosing (e.g., only one of two party has initialized closing), and the second of the two parties called the initialize close function (e.g., the public key of the currently calling party, caller.vk, is not the public key included in the close requestor variable, closeRequestor), the initialize close function may set the contract status variable of the interaction channel to a cooperative closing status, CooperativeClosing, (e.g., both parties have initialized closing).

An exemplary withdraw function, denoted by withdraw( ), is shown in the smart contract 200. The withdraw function may be used to withdraw digital currency from the smart contract 200. That is, the withdraw function can initiate the transfer of digital currency from the smart contract 200 to the blockchain accounts of the entities to the smart contract 200 upon closing of the interaction channel.

At line 1, the withdraw function may first perform several verification checks. For example, the withdraw function may determine if the contract status variable of the interaction channel is either an active status, Active, or a closed status, Closed, (e.g., meaning the interaction channel is either currently in use, or has already been closed). At line 2 of the withdraw function, the withdraw function may additionally perform a verification check to determine if the interaction channel is currently active, but has passed its expiry time.

At line 3 of the withdraw function, the withdraw function may then add the final credit variable to the client deposit variable and subtract the final credit variable from the server deposit variable. The withdraw function may then invoke a transfer function of a blockchain network to perform an on-chain transfer. For example, the withdraw function may cause the first blockchain network 104 to transfer the (clientDeposit+finalCredit) amount of digital currency to the first user's account, and the (serverDeposit−finalCredit) amount of digital currency to the hub computer 120 account. Then, at line 4 of the withdraw function, the withdraw function may then set the contract status variable of the universal payment channel to a closed status, Closed.

An exemplary claim protocol is shown in the smart contract 200. The claim protocol may be used to claim an interaction on-chain. The claim protocol, denoted by Claim (cid, idx, clientCredit, txAmount, hash, expiry, secretReceived, σ, secret), may take several inputs including a channel identifier ("cid") an index ("idx"), a client credit ("clientCredit") an interaction amount ("txAmount"), a hash ("hash"), an expiry time (expiry), a secret received indicator ("secretReceived"), a signature ("σ"), and a secret ("secret").

At line 1 of the claim protocol, the claim protocol may first perform verification checks. For example, the claim protocol may determine if the input index is less than or equal to the final index variable of the interaction channel.

At line 2 of the claim protocol, the claim protocol may additionally determine if a secret was received by the called by checking the value of the secret received indicator (e.g., secretReceived="0" may indicate no secret has been received by the caller, and secretReceived="1" may indicate a secret has been received by the caller). If no secret has been received by the caller, the claim protocol may determine if the current time has passed the channel expiry time. The claim protocol may also determine if the input secret hashes (e.g., using a predetermined hash function) correctly to equal the input hash.

At line 3 of the claim protocol, the claim protocol may then determine the identity of the caller. For example, if the public key of the calling party, caller.vk, is equal to the server public key, the claim protocol may first verify the input signature, σ. The input signature, σ, may be a digital signature on the variables [channelID, idx, clientCredit, txAmount, hash, expiry, secretReceived]. The claim protocol can verify the signature, σ, by retrieving the client public key from the interaction channel to verify the signature, σ. The claim protocol may then verify the interaction amount is less than the amount of digital currency held by the client (e.g., a client credit variable, clientCredit, may store an amount of digital currency transferred using the interaction channel that increase/decrease the amount of digital currency of the client, such that the amount of digital currency held by the client at any point is equal to clientDeposit+clientCredit). If the amount of digital currency held by the client is sufficient to cover the interaction amount, the claim protocol may update the final credit variable ("finalCredit") to equal the transaction amount ("txAmount") subtracted from the client credit variable ("clientCredit") (i.e., the client transferred, txAmount, of digital currency to the server).

A similar process can occur if the public key of the calling party, caller.vk, is equal to the client public key. The input signature, σ, can be verified by retrieving the server public key from the interaction channel. The claim protocol would instead determine if the interaction amount, txAmount, is less than the amount of digital currency held by the server (e.g., serverDeposit−clientCredit). The claim protocol may update the final credit variable to equal the interaction amount added to the client credit variable (e.g., the server transferred, txAmount, of digital currency to the client).

At line 4 of the claim protocol, the claim protocol may then update the final index variable to equal the input index. Then, in line 5 of the claim protocol, the initialize close function may be invoked to end the claim protocol.

FIG. 3 shows pseudocode for helper functions 300 of a smart contract according to embodiments. The plurality of helper functions 300 can be associated with a smart contract. The helper functions 300 may be used, in conjunction with the functions and protocols of the smart contract, to maintain the interaction channel. The helper functions 300 can include a generate promise function, a verify promise function, a generate receipt function, a verify receipt function, and an update local state function.

A promise may be used by a first user to interact with a second user. For example, a promise includes parameters for a first user to transfer a first amount of a first digital currency to a second user. A promise can include several parameters associated with the proposed interaction, a smart contract, and an interaction channel used to perform the interaction. Examples of such parameters can include a channel identifier that identifies the interaction channel to be used for the interaction, a contract status variable of the interaction channel (e.g., "Active," "Closed," etc.), an index variable, a client credit variable that tracks the amount of digital currency held by a client, a proposed interaction amount (e.g., an amount of digital currency to be transferred from the first user to the second user), a hash value, wherein the hash is generated by hashing some underlying secret value (e.g., hash=Hash(secret)), an expiry time after which the promise can no longer be claimed, a secret received indicator, and a digital signature on the previously mentioned variables. A promise can be included in a list of promises of a smart contract.

A receipt may be used to claim a promise. A receipt can include several variables associated with a smart contract and an interaction channel. The variables included in a receipt can be variables of a smart contract and an interaction channel that are updated with variables of a promise (e.g., the variables may be updated by using the claim protocol of the smart contract 300). For example, a promise may include a proposed interaction amount, where a client credit is proposed to be increased by the interaction amount. The receipt may include an updated client credit that includes the interaction amount. A receipt can indicate that an interaction has been finalized, and the variables included in the receipt are the final variables after the interaction has been performed. A receipt can be included in a list of receipts of a smart contract.

The generate promise function, denoted by CreatePromise (cid, state, txAmount, hash, expiry, sk), can be used to generate a promise. At line 1 of the generate promise function, the generate promise function may set the secret received indicator to equal "0" (e.g., a promise for an interaction has been generated, but the underlying secret has not yet been revealed). At line 2 of the generate promise function, the generate promise function may generate a promise using the input variables. The promise includes several variables of both a smart contract and an interaction channel. The variables can include a channel identifier ("cid"), an index variable ("idx"), a client credit variable ("clientCredit"), an interaction amount ("txAmount"), a hash ("hash"), an expiry time ("expiry"), a secret received indicator ("secretReceived"), and a digital signature on the previous variables (e.g., using an input secret key, sk). The promise, shown as [cid, idx, clientCredit, txAmount, hash, expiry, secretReceived, σ] in FIG. 3, can then be output and added to the smart contract associated with the interaction channel.

The verify promise function, denoted by VerifyPromise (promise, cid, state, txAmount, hash, expiry, vk), can be used to verify a promise. The verify promise function may take as input a promise, variables used to generate the promise, [cid, state, txAmount, hash, expiry], and a verification key. At line 1 of the verify promise function, the verify promise function may set the secret received indicator to equal "0." At line 2 of the generate promise function, the generate promise function may verify the signature of input promise, promise.σ, by verifying the signature using the verification key and comparing the variables of the signature to the input variables.

The generate receipt function, denoted by CreateReceipt (cid, state, sk), can be used to generate a receipt. The generate receipt function may take as input a channel identifier, a state of an interaction channel, and a secret key. At line 1 of the generate receipt function, the interaction amount, txAmount, the hash, and the expiry of the latest receipt on the interaction channel identified by the channel identifier may be set to zero or null, and the secret received indicator may be set to "1" (e.g., the underlying secret of a promise was received, and as such the promise can be claimed). For example, the generate receipt function may use the channel identifier to identify an interaction channel. The interaction channel may be associated with a smart contract that includes a promise. At line 2 of the generate receipt function, the receipt may generate a receipt using the updated variables of the promise. For example, shown in FIG. 3 is a receipt including variables of [cid, idx, clientCredit, txAmount, hash, expiry, secretReceived, σ]. From this list of variables, cid is received as input, idx is retrieved from the promise, clientCredit is retrieved from the promise, and txAmount, hash, expiry, and secretReceived are updated. The signature, σ, may be a digital signature on the previous variables. The receipt may then be output and added to a list of receipts of the smart contract.

The verify receipt function, denoted by VerifyReceipt (receipt, cid, state, txAmount, hash, expiry, vk), can be used to verify a receipt. The verify receipt function may take as input a receipt, variables used to generate the receipt, [cid, state, txAmount, hash, expiry], and a verification key. At line 1 of the verify receipt function, the verify receipt function may set the interaction amount, the hash, and the expiry to zero or null, and the secret received indicator to equal "1." At line 2 of the generate receipt function, the generate receipt function may verify the signature of input receipt, receipt.σ, by verifying the signature using the verification key and comparing the variables of the signature to the input variables.

The update local state function, denoted by UpdateLocalState(localState, promise, increaseCredit), can be used to update the variables of a local smart contract. The update local state function may take as input a local state of a smart contract (e.g., a locally stored copy of the smart contract, which may differ from the smart contract deployed on the blockchain), a promise, and an increase credit indicator. At line 1 of the update local state function, the update local state function may update the index variable of the smart contract (e.g., if the index variable is a linear counter, the update may increase prior index variable by one). At lines 2 and 3 of the update local state function, the update local state function may determine if the client credit variable is to be increased by checking the value of the increase credit indicator. For example, if the increase credit indicator is equal to "1," then the update local state function can determine the client credit variable in the local state of the smart contract is to be increased by the interaction amount of the input promise (e.g., localState.clientCredit+promise.txAmount). In another example, if the increase credit indicator is equal to "0," then the update local state function can determine the client credit variable in the local state of the smart contract is to be decreased by the interaction amount of the input promise (e.g., localState.clientCredit−promise.txAmount). At line 4 of the update local state function, the updated local state can be output.

FIG. 4 shows a contract and time event handler 400 of a smart contract according embodiments. The contract and time event handler 400 may be a processing thread that loops continuously, checking the status of the contract and time-based offline events. The contract and time event handler 400 may monitor each interaction channel, C, established by a party. At line 1, the contract and time event handler 400 may check the status of a interaction channel.

At line 2, the contract and time event handler 400 determines if the contract status is a closed status, Closed. If the interaction channel is closed, the contract and time event handler 400 may set the interaction channel variable, C, to zero or null such that the interaction channel is no longer included in the list of the interaction channels established by the party.

At line 3, the contract and time event handler 400 determines if the contract status is a cooperative closing status, CooperativeClosing. If the interaction channel is in a cooperative closing status, the contract and time event handler 400 can invoke the withdraw function of the smart contract on the interaction channel.

At line 4, the contract and time event handler 400 determines if the contract status is a unilateral closing status, UnilateralClosing. At line 4*a*, the contract and time event handler 400 may determine if the smart contract contains a promise and determine if the secret of a promise has been revealed, and if it has, then the contract and time event handler 400 may invoke the claim protocol of the smart contract using the promise as input. At line 4*b*, the contract and time event handler 400 may determine if the smart contract contains a receipt, and if so, may invoke the claim protocol of the smart contract using the receipt as input. At line 4*c*, the contract and time event handler 400 may determine if the smart contract contains no receipts, and a contains a promise without a revealed secret, and if so, may invoke the initialize close function of the smart contract. At line 4*d*, the contract and time event handler 400 may determine if the interaction channel has passed the expiry time, and if so, invoke the withdraw function of the smart contract.

At line 5, the contract and time event handler 400 determines if the contract status is equal to "Active" and if the promise has not yet expired. At line 5*a*, the contract and time event handler 400 may determine if the secret of a promise has been revealed, and if it has, then the contract and time event handler 400 may invoke the claim protocol of the smart contract using the promise as input. At line 5*b*, the contract and time event handler 400 may then remove the promise from the smart contract.

Figure 5:
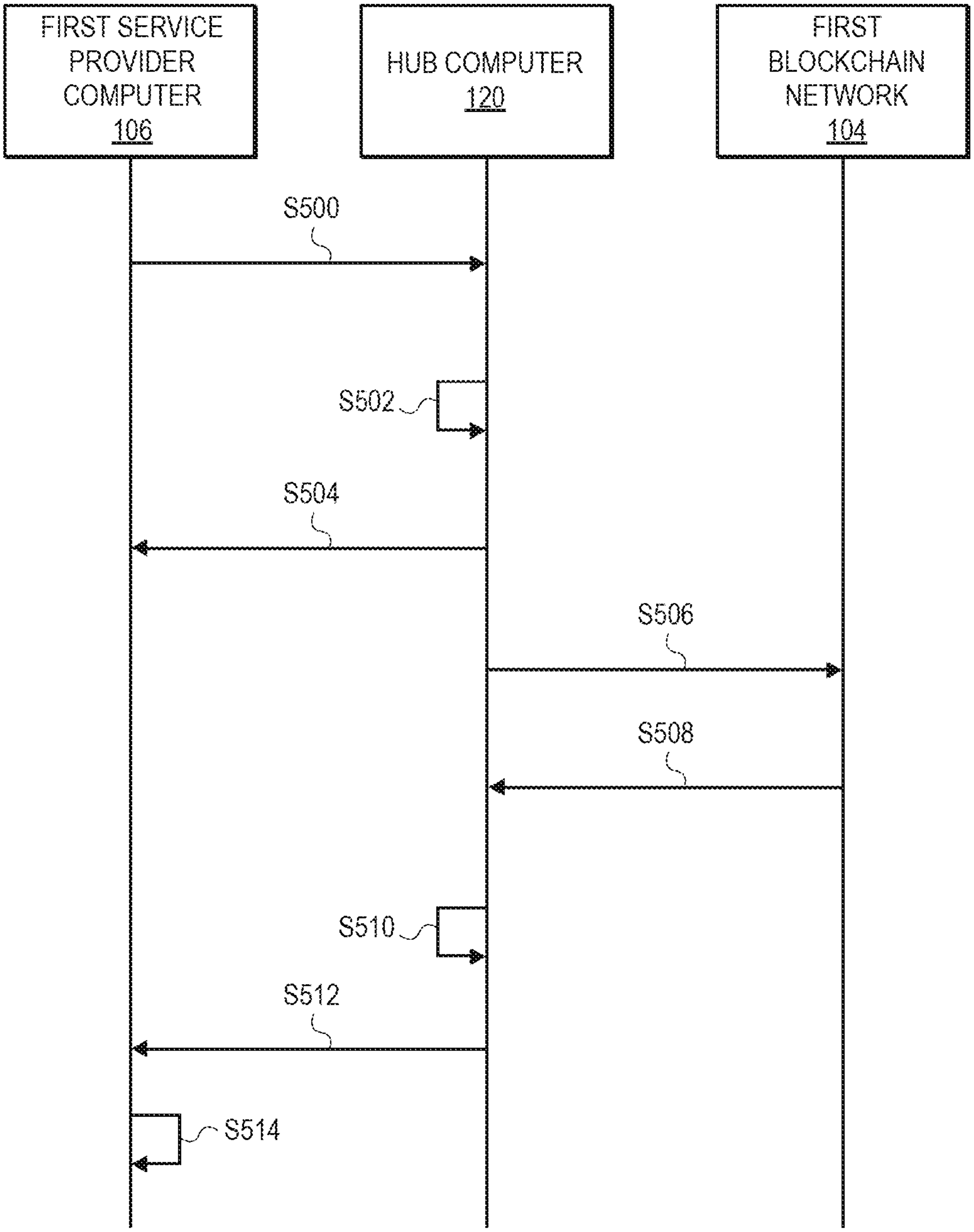
FIG. 5 shows a flow diagram for a channel deploy protocol according to embodiments.

FIG. 5 shows a flowchart for a channel deploy protocol according to embodiments. The channel deploy protocol deploy protocol may be used to deploy an interaction channel. The first service provider computer 106 may receive instructions from a first user device 108 to begin the channel deploy protocol. In some embodiments, the first service provider computer 106 and the hub computer 120 may agree on some contract parameters prior to the channel deploy protocol, including a channel identifier, and a dispute time.

At step S500, the first service provider computer 106 may transmit a request to open an interaction channel on the first blockchain network 104 to the hub computer 120. The request may include a public key of the first user, a channel identifier and a channel dispute time used to deploy a first smart contract. The public key of the first user may be an example of a first user account identifier that identifies a first digital currency account of the first user on the first blockchain network 104.

At step S502, after receiving the request to open the interaction channel from the first service provider computer 106, the hub computer 120 may verify the first blockchain network 104 is a supported blockchain network. For example, the hub computer 120 may verify a collateral channel has been established with the first blockchain network 104. The hub computer 120 may generate a request identifier for the received request. The request identifier may be used by the first service provider computer 106 to monitor the status of the first smart contract deployment. The first smart contract may not be immediately deployed on the first blockchain network 104, and so the request identifier may be used by the first service provider computer 106 to query the hub computer 120 on the status of the first smart contract deployment.

At step S504, after initiating the deployment of the first smart contract, the hub computer 120 may transmit the request identifier and the channel identifier to the first service provider computer 106.

At step S506, the hub computer 120 may transmit a smart contract deployment request to the first blockchain network 104. The hub computer 120 may invoke a deploy contract function of the first blockchain network 104 to deploy the first smart contract to the first blockchain network 104. For example, the hub computer 120 may transmit instructions to run the deploy contract function using the first smart contract code (e.g., the code used to generate the first smart contract, similar to the pseudocode of the smart contract 200 of FIG. 2).

At step S508, after receiving the smart contract deployment request, the first blockchain network 104 may run the deploy contract function to obtain a contract identifier. The contract identifier may be an address of the first smart contract on the first blockchain network 104. After obtaining the contract identifier, the first blockchain network 104 may transmit the contract identifier to the hub computer 120.

At step S510, after receiving the contract identifier from the first blockchain network 104, the hub computer 120 may use the initialize function of the first smart contract to deploy the first smart contract to the blockchain network. For example, the hub computer 120 may use the initialize function with its own public key, the public key of the first user device 108, the channel identifier, and the dispute time as input to initialize the first smart contract with the input variables on the first blockchain network 104. The first smart contract may thereafter implement an interaction channel between the first service provider computer 106 and the hub computer 120, which can be identified by the channel identifier.

At step S512, after initializing the first smart contract on the first blockchain network 104, the hub computer 120 may transmit the request identifier and the contract identifier to the first service provider computer 106.

At step S514, after receiving the request identifier and the contract identifier from the hub computer 120, the first service provider computer 106 may verify the deployment of the first smart contract. For example, the first service provider computer 106 may retrieve the parameters of the first smart contract (e.g., using a get parameters function) and verify the channel identifier, the public key of the first user device 108, the public key of the hub computer 120, and the dispute time are equal to the correct values. In some embodiments, the first service provider computer 106 may access the first blockchain network 104 using the contract identifier to retrieve the first smart contract. After verifying the parameters of the first smart contract, the first service provider computer 106 may store the first smart contract locally.

A similar process can be performed between the second blockchain network 114, the second service provider computer 116, and the hub computer 120 to deploy a second smart contract to the second blockchain network 114.

Figure 6:
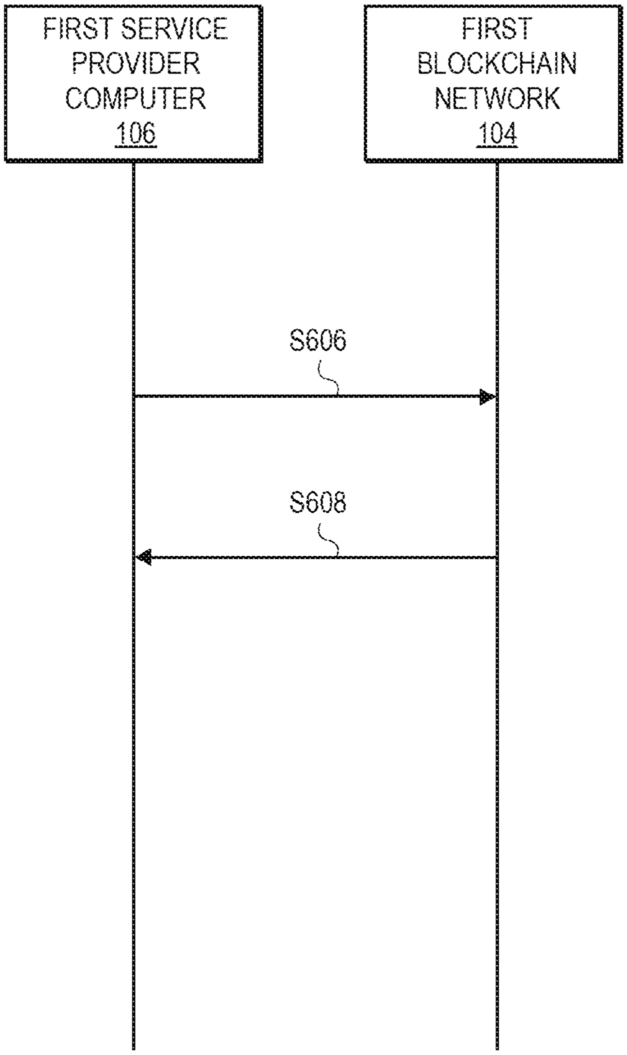
FIG. 6 shows a flow diagram for a check channel status protocol according to embodiments.

FIG. 6 shows a flowchart for a check channel status protocol according to embodiments. The check channel status protocol may be used by a service provider computer to check the state of a smart contract on a blockchain. For example, after requesting deployment of a first smart contract to the first blockchain network 104, the first service provider computer 106 may check the status of the deployment of the first smart contract using the check channel status protocol. The check channel status protocol may be used after the contract is deployed to retrieve the most recent parameters and state information of the smart contract.

At step S606, the first service provider computer 106 may transmit a check channel status request to the first blockchain network 104. The check channel status request may include the request identifier generated in step S502 of FIG. 5, or a contract identifier.

At step S608, after receiving the contract identifier or the request identifier from the first service provider computer 106, the first blockchain network 104 may transmit the parameters and the state information of the first smart contract to the first service provider computer 106. The parameters and the state information may include data provided by the get state function of the first smart contract, including a status of the interaction channel, status, the final index variable, finalidx, the final credit variable, finalCredit, the server deposit variable, serverDeposit, the client deposit variable, clientDeposit, the channel expiry variable, channelExpiry, and the close requestor variable, closeRequestor, of the first smart contract, the public key of the first user device 108, a public key of the hub computer 120, a channel identifier, a dispute time, etc.

Figure 7:
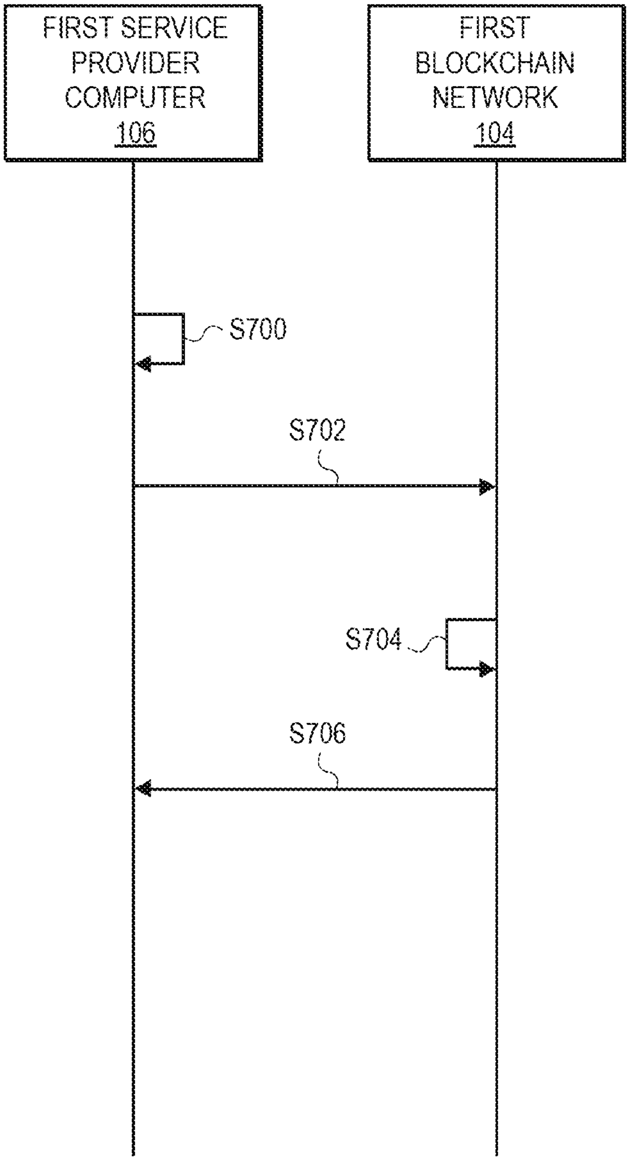
FIG. 7 shows a flow diagram for a deposit protocol according to embodiments.

FIG. 7 shows a flowchart for a deposit protocol according to embodiments. The deposit protocol may be used after a smart contract is deployed to a blockchain network to transfer an amount of a digital currency to the smart contract on the blockchain network. For example, the first user device 108 may transmit a deposit request to the first service provider computer 106. The deposit request may include instructions to use the deposit protocol to transfer an amount of a first digital currency to a first smart contract on the first blockchain network 104. The deposit request may include a contract identifier (e.g., an address of a first smart contract on the first blockchain network 104) and an indication of an amount of a first digital currency to be transferred to the first smart contract identified by the contract identifier. The deposit request may further include a first user account identifier (e.g., a public key of the first user device 108 provided by the first service provider computer 106) that identifies an account of the first user operating the first user device 108 on the first blockchain network 104. The first user account identifier may be used by the first service provider computer 106 to verify the first user holds an account to provide the amount of the first digital currency to be transferred.

At step S700, after receiving the deposit request from the first user device 108, the first service provider computer 106 may verify that the first smart contract is active. For example, the first service provider computer 106 may use the check channel status protocol of FIG. 6 to retrieve parameters and state information of the first smart contract including an active status of the first smart contract.

At step S702, after retrieving the parameters and status information of the first smart contract, the first service provider computer 106 may initiate a transfer of the amount of the first digital currency to the first smart contract with the first blockchain network 104. For example, the first service provider computer 106 may transmit a transfer request to the first blockchain network 104, the transfer request including instructions to transfer the amount of the first digital currency from the first user's account identified by the first user account identifier, to the first smart contract identified by the contract identifier. The first service provider computer 106 may then update the locally stored first smart contract to include the first deposit of the amount of digital currency.

At step S704, after receiving the transfer request from the first service provider computer 106, the first blockchain network 104 may transfer the amount of the first digital currency from the first user's account to the first smart contract.

At step S706, after completing the transfer of the amount of first digital currency from the first user's account to the first smart contract, the first blockchain network 104 may notify the first service provider computer 106, or the first service provider computer 106 may access the first blockchain network 104 to confirm that the transfer of the amount of the first digital currency is complete. The first service provider computer 106 may update then the local copy of the first smart contract to include the amount of the first digital currency. The first service provider computer 106 may then transmit a notification to the first user device 108 that the deposit is complete.

A similar process may be performed by the hub computer 120 to deposit first digital currency to the first smart contract. Additionally, the second user device 118, in conjunction with the second service provider 116, may perform a similar process to deposit second digital currency to the second smart contract.

FIG. 8 shows an authorize protocol 800 according to embodiments. Party A may wish to interact with party B. The interaction may include a transfer of digital currency from party A to party B. For example, the first user operating the first user device 108 may wish to access a resource provided by the second user operating the second user device 118. Before the authorize protocol begins, party B may provide an interaction proposal to party A. For example, party B can provide an interaction proposal comprising an interaction amount, txAmount, an interaction timeout, txExpiry, and a hash. The hash may be a hash of a secret value (e.g., hash=Hash(secret)), where only party B initially knows the underlying secret. The first interaction channel, used by party A for the interaction, can be denoted by $cid_A$. Similarly, the second interaction channel used by party B for the interaction can be denoted by $cid_B$. The public key of party A can be denoted by $vk_A$ (e.g., the public key of the first user device 108), the public key of party B by $vk_B$ (e.g., the public key of the second user device 118), and the public key of the server S by $vk_S$ (e.g., the public key of the hub computer 120).

Party A may initiate the authorize protocol by creating a sender promise, $P_A$, using a generate promise function using the first interaction channel identifier, $cid_A$, the local state of the first smart contract, $C_A$.localstate, the interaction amount, txAmount, the hash, a complete interaction expiry time of the first ledger (e.g., a complete interaction expiry time may include both the interaction expiry time, txExpiry, a delay time of the first ledger which the interaction channel is on, $ledger_A.\Delta$), and a secret key of the party A, $sk_A$. The sender promise may include the first interaction channel identifier, $cid_A$, the local state of the first smart contract, $C_A$.localstate, the interaction amount, txAmount, the hash, a complete interaction expiry time of the first ledger (e.g., a complete interaction expiry time may include both the interaction expiry time, txExpiry, a delay time of the first ledger which the interaction channel is on, $ledger_A.\Delta$), and a digital signature of the foregoing, generated using the secret key of the party A, $sk_A$. The sender promise, $P_A$, may be added to a list of promises of the local copy of the first smart contract, $C_A$. After adding the sender promise, $P_A$, to the list of promises of the local copy of the first smart contract, $C_A$, party A may transmit the sender promise, $P_A$, and an indication of party B to the server S. The sender promise, $P_A$, may include the interaction amount, txAmount, which may be a first amount of a first digital currency. Thus, party A may transfer the first amount of a first digital currency to server S by transmitting the sender promise.

Upon receiving the sender promise from party A (e.g., after receiving a first amount of a first digital currency from party A), the server S may add the sender promise, $P_S$, to a list of promises of a local copy of the first smart contract, $C_{S,A}$. The server S may then generate a server promise, $P_S$, using the generate promise function using the second interaction channel identifier, $cid_B$, the local state of the second smart contract, $C_{S,B}$.localstate, the interaction amount of the sender promise, $P_A$.txAmount, the hash of the sender promise, $P_A$.hash, a complete interaction expiry time of the second ledger (e.g., a complete interaction expiry time that can include the interaction expiry time, txExpiry, and the delay time of the $ledger_A.\Delta$, such that the expiry time of the second ledger is shorter than the expiry time of the first ledger), and the secret key of the server, $sk_S$. The server promise may include the second interaction channel identifier, $cid_B$, the local state of the second smart contract, $C_{S,B}$.localstate, the interaction amount of the sender promise, $P_A$.txAmount, the hash of the sender promise, $P_A$.hash, a complete interaction expiry time of the second ledger (e.g., a complete interaction expiry time that can include the interaction expiry time, txExpiry, and the delay time of the $ledger_A.\Delta$, such that the expiry time of the second ledger is shorter than the expiry time of the first ledger), and a digital signature of the foregoing, which is generated using the secret key of the server, $sk_S$ The server S may then add the server promise, $P_S$, to the list of promises of a local copy of a second smart contract, $C_{S,B}$. The interaction amount of the sender promise, $P_A$.txAmount, may be the first amount of the first digital currency, or may be a second amount of a second digital currency that is equivalent. The server S may then transmit the server promise, $P_S$, to party B. By transmitting the server promise, $P_S$, to party B, the server S may transfer a second amount of a second digital currency to Party B.

Upon receiving the server promise, $P_S$, from the server S, party B may add the sender promise, $P_B$, to a list of promises of a local copy of the second smart contract, $C_B$. Additionally, party B may add the secret of the hash to the server promise.

Figure 9:
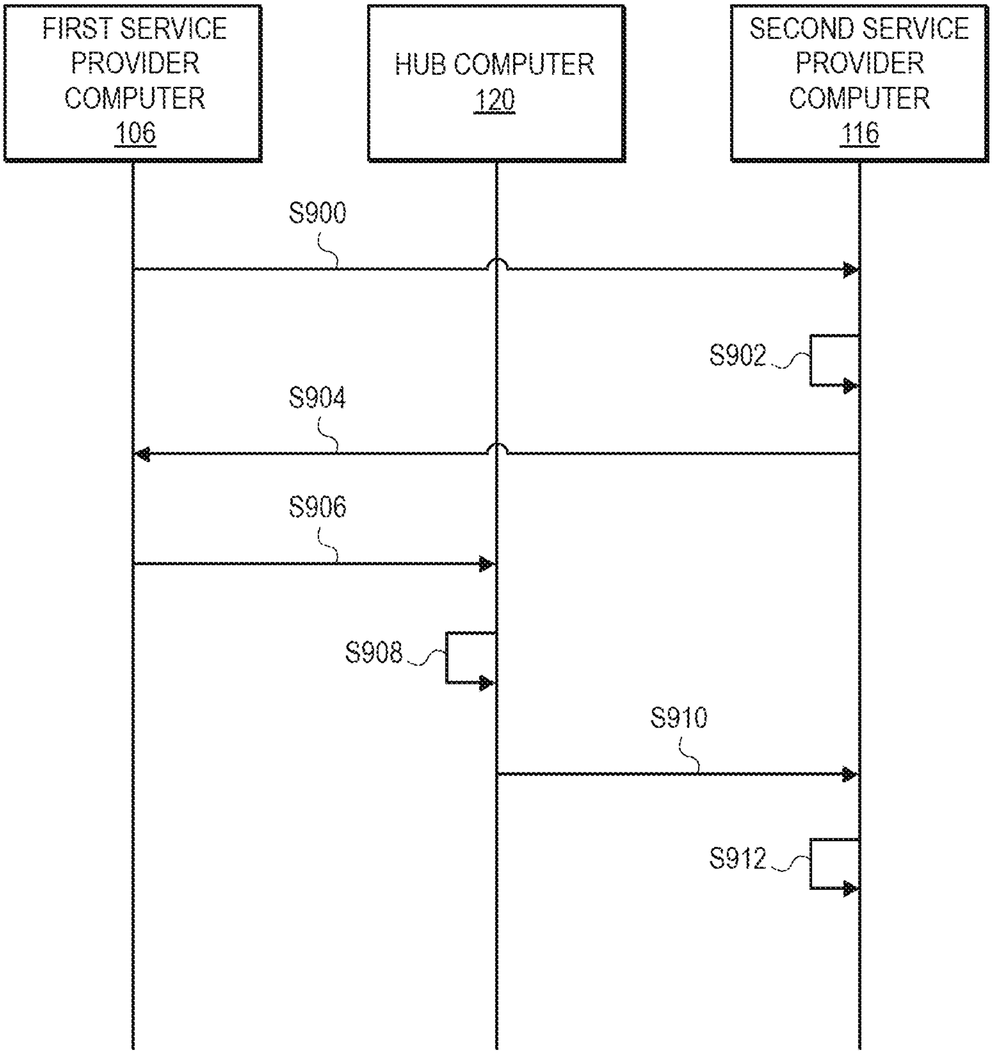
FIG. 9 shows a flow diagram for an authorize protocol according to embodiments.

FIG. 9 shows a flowchart for an authorize protocol according to embodiments. The authorize protocol of FIG. 8 can be implemented in the system of FIG. 1. For example, the first service provider computer 106 may take the role of party A, the second service provider computer 116 may take the role of party B, and the hub computer 120 may take the role of the server S. The first user device 106, via the first service provider computer 106, may initiate an interaction with the second user device 116, via the second service provider computer 116. Communications from the first user device 108 to the hub computer 120 can occur via the first service provider computer 106 through a first interaction channel implemented by a first smart contract. The first interaction channel may connect the first user device 108 to the hub computer 120 via the first service provider computer 106. Similarly, communications from the second user device 118 to the hub computer 120 can occur via the second service provider computer 116 through a second interaction channel implemented by a second smart contract. The second interaction channel may connect the second user device 118 to the hub computer 120 via the second service provider computer 116. In the example of FIG. 9, the communications to and from user devices are shown as originating/ending at service provider computers, however, there may be an additional transmission step of data to the user devices which is omitted for brevity.

At step S900, the first service provider computer 106 may transmit an interaction request with the second service provider computer 116. For example, the first service provider computer 106 may receive instructions from a first user device 108 to initiate a transfer of a first amount of a first digital currency to the second service provider computer 116. For example, the first amount of a first digital currency may be 10 USDC.

At step S902, after receiving the interaction request from the first service provider computer 106, the second service provider computer 116 may generate an interaction proposal comprising the second channel identifier, an interaction expiry time, the first amount of the first digital currency, and a hash generated by hashing a secret value known by the second service provider computer 116.

At step S904, after generating the interaction proposal, the second service provider computer 116 may transmit the interaction proposal to the first service provider computer 106.

At step S906, after receiving the interaction proposal from the second service provider computer 116, the first service provider computer 106 may generate a sender promise using data in the interaction proposal. The first service provider computer 106 may generate a sender promise using a generate promise function with first parameters as inputs. The first parameters may include data in the interaction proposal and of the first smart contract. For example, the first parameters may include a first interaction channel identifier, a local state of a first smart contract, the first amount of the first digital currency, the hash, a first complete expiry time, and a secret key of the first service provider computer 106. The sender promise may include the first interaction channel identifier, the local state of a first smart contract, the first amount of the first digital currency, the hash, the first complete expiry time, and a digital signature of the foregoing concatenated together, the digital signature formed using the secret key of the first service provider computer 106. The sender promise may then be transmitted to the hub computer 120. By transmitting the sender promise to the hub computer 120, the first service provider computer 106 may transfer a first amount of a first digital currency to the hub computer 120. The sender promise may transfer the first amount of the first digital currency to the hub computer 120 without connection to the first blockchain network. At a later stage, the sender promise may be used by the hub computer 120 to claim the transfer of digital currency on-chain (e.g., using a claim function with the sender promise or a server receipt after closing the first interaction channel).

At step S908, after receiving the sender promise from the first service provider computer 106, the hub computer 120 may verify the digital signature on the first parameters of the sender promise. For example, the hub computer 120 may retrieve the public key of the first user device 108 to verify the digital signature on the first parameters. The hub computer 120 may then determine if the first smart contract comprises a first digital currency amount sufficient for the interaction. For example, the hub computer 120 may access a local copy of the first smart contract to determine if a client deposit (e.g., the first user's initial digital currency deposit to the first smart contract), along with any client credit amount (e.g., increases or decreases to the first user's digital currency in the smart contract), is greater than the first amount of the first digital currency of 10 USDC (e.g., the current transfer amount). One such example may include the first smart contract initially comprising a client deposit of 1000 USDC, and a client credit of −500 USDC. The hub computer 120 may thus determine that the first digital currency amount of the first service provider computer 106 in the first smart contract of 500 USDC is sufficient for the 10 USDC transfer to be completed. The hub computer 120 may additionally determine if there is sufficient time to claim the sender promise. For example, the hub computer 120 may compare the expiry time of the sender promise to the combined delay time of the first blockchain network 104 and the second blockchain network 114. The hub computer 120 may then add the sender promise to a list of promises of the first smart contract.

As the sender promise can be used to perform an on-chain transfer of digital currency using a claim function of the first smart contract the hub computer 120 in effect receives a first amount of a first digital currency from the first service provider computer 106 via the first interaction channel. The hub computer 120 may thereafter begin a transfer of a second amount of a second digital currency to the second service provider computer 116. The hub computer 120 may then generate a server promise using the generate promise function with second parameters as inputs. The second parameters can include the second interaction channel identifier, a local state of the second smart contract, the first amount of the first digital currency in the sender promise, the hash of the sender promise, a second complete expiry time, and a secret key of the hub computer 120. The second promise may include the second interaction channel identifier, the local state of the second smart contract, the first amount of the first digital currency in the sender promise, the hash of the sender promise, a second complete expiry time, and a digital signature of the foregoing concatenated together. The digital signature may be generated using the secret key of the hub computer 120. The hub computer 120 may then add the server promise to a list of promises of the second smart contract. The secret key of the hub computer 120 may be used to generate a digital signature on the second parameters of the server promise.

At step S910, after generating the server promise, the hub computer 120 may transmit the server promise to the second service provider computer 116. The transmission of the server promise to the second service provider computer 116 may be an example of the hub computer 120 transferring a second amount of a second digital currency to the second service provider computer 116 via the second interaction channel. The server promise may transfer the second amount of the second digital currency to the second service provider computer 116 without connection to the second blockchain network. At a later stage, the server promise may be used by the second service provider computer 116 to claim the transfer of digital currency on-chain (e.g., using a claim function with the server promise or a receiver receipt after closing the second interaction channel).

At step S912, after receiving the server promise from the hub computer 120, the second service provider computer 116 may verify the digital signature on the second parameters of the server promise. For example, the second service provider computer 116 may retrieve the public key of the hub computer 120 from the second smart contract to verify the digital signature on the second parameters. The second service provider computer 116 may then determine if the second smart contract comprises a server deposit amount sufficient for the interaction. For example, the second service provider computer 116 may determine if a server deposit, subtracting any client credit amount, is greater than a second amount of a second digital currency, wherein the second amount of the second digital currency is equivalent in value to the first amount of the first digital currency. One such example may include the second smart contract initially depositing an amount of 5000 eCNY (digital yuan) to the second smart contract, and a client credit amount of 3150 eCNY (e.g., an amount of second digital currency). The second service provider computer 116 may thus determine that the amount of second digital currency of the hub computer 120 of 1850 eCNY is sufficient for the 60 eCNY (an amount of eCNY roughly equivalent to 10 USDC) transfer to be made. The second service provider computer 116 may additionally verify the interaction expiry time has not yet been reached. After performing the various checks, the second service provider computer 116 may add the server promise to a list of promises of the second smart contract. The second service provider computer 116 may additionally add the secret of the hash to the server promise. At a later time, the second service provider computer 116 may use the promise in a transfer protocol to claim the payment.

FIG. 10 shows pseudocode for a transfer protocol 1000 according to embodiments. The transfer protocol 1000 may be used to complete an interaction indicated by a promise. The transfer protocol 1000 can be used to convert a promise into a receipt that can be claim a transfer performed off-chain to a blockchain.

A party B may wish to complete the interaction on a second interaction channel. Party B may begin the transfer protocol 1000 by updating a local state of a second smart contract using an update local state function with the current local state of the second smart contract, $C_B$.localstate, the server promise, $C_B$.promise, and an increase credit indication of "1" (e.g., party B is claiming the transfer, so an increase credit indication of "1" will add the interaction amount to the client credit variable). The updated local state of the second smart contract includes an updated client credit, such that the total amount of second digital currency available to party B in the second smart contract is (clientDeposit+clientCredit). In some embodiments, if not already added, party B may then add the secret of the hash to the server promise. Party B may then transmit the secret, and an indication of party A to the server S.

Upon receiving the secret and the indication of party A from party B, the server S may then verify the secret correctly hashes to the hash of the server promise by comparing the hashed secret to the previously received hash. If the hashes match, the server S may then update a local state of the second smart contract using an update local state function with the current local state of the second smart contract, $C_B$.localstate, the server promise, $C_B$.promise, and an increase credit indication of "1" (e.g., party B is claiming the transfer, so an increase credit indication of "1" will add the interaction amount to the client credit variable).

The server S may then generate a receiver receipt, $\text{receipt}_S$, using a generate receipt function with second parameters of the second smart contract and the secret key of the server S, $sk_S$, as input. The second parameters of the second smart contract can include the second interaction channel identifier, $cid_B$, and the local state of the second smart contract, $C_{S,B}$.localstate. The secret key of the server S can be used to generate a digital signature on the second parameters of the second smart contract. The server S may then remove the server promise, $P_S$, from the list of promises of the second smart contract. The server S may then transmit the receiver receipt, $receipt_S$, to party B.

The server S may then update a local state of the first smart contract using the update local state function with the current local state of the first smart contract, $C_{S,A}$.localstate, a sender promise, $C_{S,A}$.promise, and an increase credit indication of "0" (e.g., party A is providing the transfer, so an increase credit indication of "0" will subtract the interaction amount from the client credit variable). The server S may then add the secret of the hash to the sender promise. The server S can then transmit the secret to party A.

Upon receiving the secret from the server S, party A may verify the secret correctly hashes to the hash of the server promise by comparing the hashed secret to the previously received hash. Party A may then update a local state of the first smart contract using the update local state function with the current local state of the first smart contract, $C_A$.localstate, the sender promise, $C_A$.promise, and an increase credit indication of "0" (e.g., party A is providing the transfer, so an increase credit indication of "0" will subtract the interaction amount from the client credit variable). Party A may then generate a server receipt, $receipt_A$, using a generate receipt function with first parameters of the first smart contract and the secret key of party A, $sk_A$, as input. The second parameters can include a first interaction channel identifier, $cid_A$, and the local state of the first smart contract, $C_A$.localstate. The secret key of party A, $sk_A$, may be used to generate a digital signature on the first parameters of the first smart contract. Party A may then remove the sender promise, $C_A$.promise, from the list of promises of the first smart contract. Party A may then transmit the server receipt, $receipt_A$, to the server S.

Upon receiving the server receipt, $receipt_A$, from party A, the server S may verify the digital signature on the first parameters of the first smart contract. The server S may then remove the sender promise, $C_{S,A}$.promise, from the list of promises of the first smart contract. The server S may then add the server receipt, $receipt_A$, to a list of receipts of the first smart contract.

Upon receiving the receiver receipt, $receipt_S$, from server S, party B may verify the digital signature on the second parameters of the second smart contract. Party B may then remove the server promise, $C_B$.promise, from the list of promises of the second smart contract. Party B may then add the receiver receipt, $receipt_S$, to a list of receipts of the second smart contract.

Figure 11:
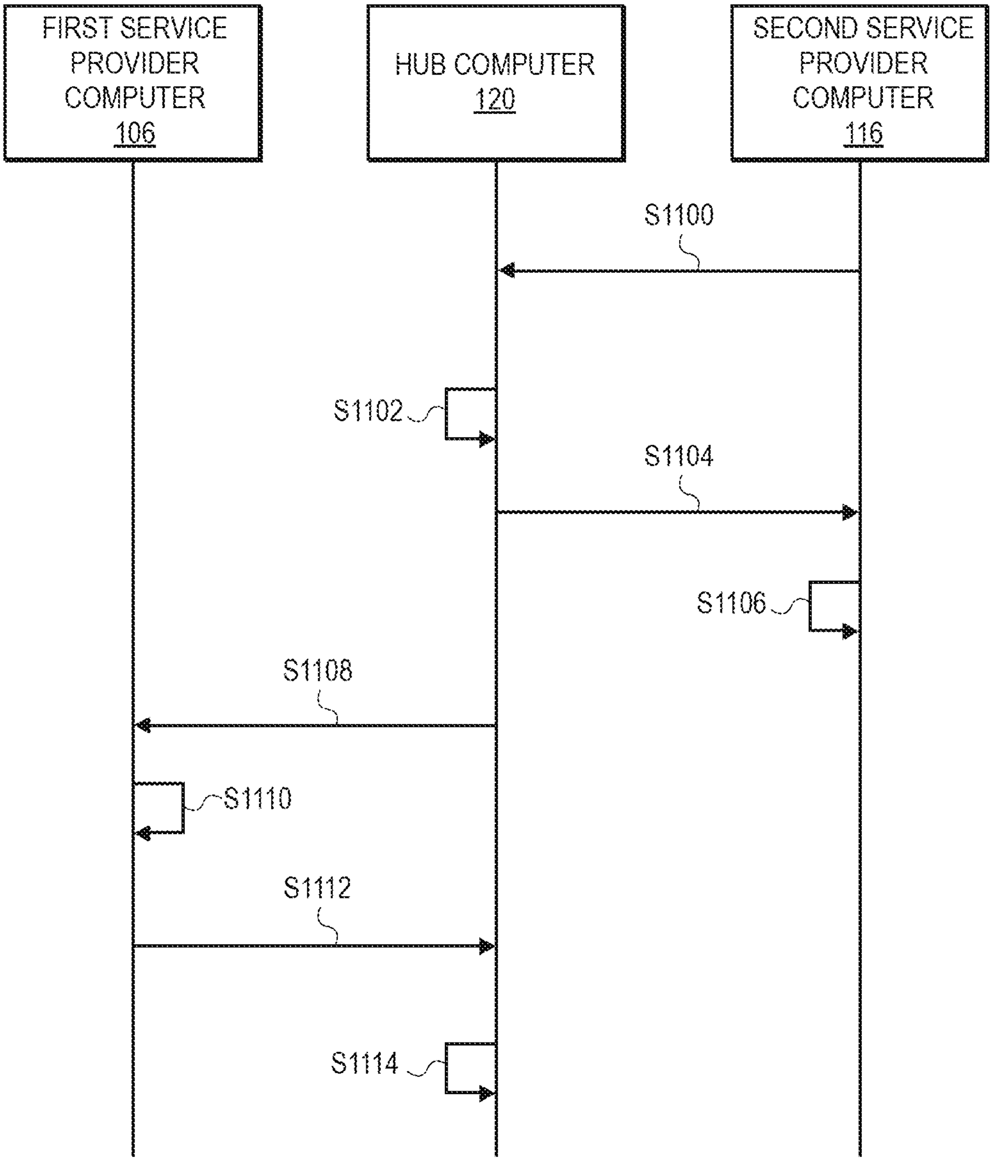
FIG. 11 shows a flow diagram for a transfer protocol according to embodiments.

FIG. 11 shows a flow diagram for a transfer protocol according to embodiments. The transfer protocol 1000 of FIG. 10 can be implemented in the system of FIG. 1. For example, the first service provider computer 106 may take the role of party A, the second service provider computer 116 may take the role of party B, and the hub computer 120 may take the role of the server S. Continuing from the authorize protocol of FIG. 8, the second service provider computer 116 may wish to claim the payment associated with the interaction on the second interaction channel. Communications from the first user device 108 to the hub computer 120 can occur via the first service provider computer 106 through a first interaction channel implemented by a first smart contract. The first interaction channel may connect the first user device 108 to the hub computer 120 via the first service provider computer 106. Similarly, communications from the second user device 118 to the hub computer 120 can occur via the second service provider computer 116 through a second interaction channel implemented by a second smart contract. The second interaction channel may connect the second user device 118 to the hub computer 120 via the second service provider computer 116. In the example of FIG. 9, the communications to and from user devices are shown as originating/ending at service provider computers, however, there may be an additional transmission step of data to the user devices which is omitted for brevity.

At step S1100, the second service provider computer 116 may transmit a receiver receipt request to the hub computer 120. The receiver receipt request may comprise the underlying secret of a hash of a sender promise (e.g., the secret of the hash included in the hash of step S902 of FIG. 9).

At step S1102, after receiving the secret from the second service provider computer 116, the hub computer 120 may verify the secret by hashing the secret and comparing the hashed secret to the hash of the server promise. The hub computer 120 may then update a local state of the second smart contract using the current local state of the second smart contract, the server promise, and an increase credit indication of "1." The updated local state of the second smart contract may include a client credit variable of a second amount of a second digital currency. For example, the current local state of the second smart contract may include an initial client credit variable of 3150 eCNY. The updated local state may increase the client credit variable by the second amount of the second digital currency (e.g., the eCNY equivalent of the 10 USDC to be transferred) to form the updated client credit variable of (roughly) 3210 eCNY. The hub computer 120 may then generate a receiver receipt comprising second parameters of the second smart contract. The hub computer 120 may use a generate receipt function using a generate receipt function with second parameters of the second smart contract and the secret key of the hub computer 120 as input. The second parameters of the second smart contract can include the second interaction channel identifier and the updated local state of the second smart contract. The secret key of the hub computer 120 can be used to generate a digital signature on the second parameters of the second smart contract. The hub computer 120 may then remove the server promise from the list of promises of the second smart contract.

The hub computer 120 may then retrieve the sender promise from the first smart contract. The hub computer 120 may then update a local state of the first smart contract using the current local state of the second smart contract, the sender promise, and an increase credit indication of "0." The updated local state of the first smart contract may include a client credit variable of a first amount of a first digital currency. For example, the current local state of the first smart contract may include an initial client credit variable of negative 500 USDC. The updated local state may decrease the client credit variable by the first amount of the first digital currency (e.g., the 10 USDC to be transferred) to form the updated client credit variable of −510 USDC.

At step S1104, after generating the receiver receipt, the hub computer 120 may transmit the receiver receipt to the second service provider computer 116.

At step S1106, after receiving the receiver receipt from the hub computer 120, the second service provider computer 116 may verify the digital signature on the second parameters of the second smart contract. For example, the second service provider computer 116 may retrieve the public key of the hub computer 120 from the second smart contract to verify the digital signature on the second parameters of the second smart contract. The second service provider computer 116 may then remove the server promise from a list of promises on the second smart contract and add the receiver receipt to a list of promises on the second smart contract.

At step S1108, after updating the local state of the first smart contract, the hub computer 120 may transmit the secret of the hash of the sender promise to the first service provider computer 106.

At step S1110, after receiving the secret of the hash of the sender promise from the hub computer 120, the first service provider computer 106 may verify the secret by hashing the secret and comparing the hashed secret to the hash of the server promise. The first service provider computer 106 may then update a local state of the first smart contract using the current local state of the second smart contract, the sender promise, and an increase credit indication of "0." The updated local state of the first smart contract may include a client credit variable of a first amount of a first digital currency. For example, the current local state of the first smart contract may include an initial client credit variable of negative 500 USDC. The updated local state may decrease the client credit variable by the first amount of the first digital currency (e.g., the 10 USDC to be transferred) to form the updated client credit variable of −510 USDC. The first service provider computer 106 may then generate a server receipt comprising first parameters of the first smart contract. The first service provider computer 106 may use a generate receipt function using a generate receipt function with first parameters of the first smart contract and the secret key of the first service provider computer 106 as input. The first parameters of the first smart contract can include the first interaction channel identifier and the updated local state of the first smart contract. The secret key of the first service provider computer 106 can be used to generate a digital signature on the first parameters of the first smart contract. The first service provider computer 106 may then remove the sender promise from the list of promises of the first smart contract.

At step S1112, after generating the server receipt, the first service provider computer 106 may transmit the server receipt to the hub computer 120.

At step S1114, after receiving the server receipt from the first service provider computer 106, the hub computer 120 may verify the digital signature on the first parameters of the first smart contract. After verifying the digital signature on the first parameters of the first smart contract, the hub computer 120 may remove the sender promise from the list of promises of the first smart contract and may add the server receipt to a list of receipts of the first smart contract.

Figure 12:
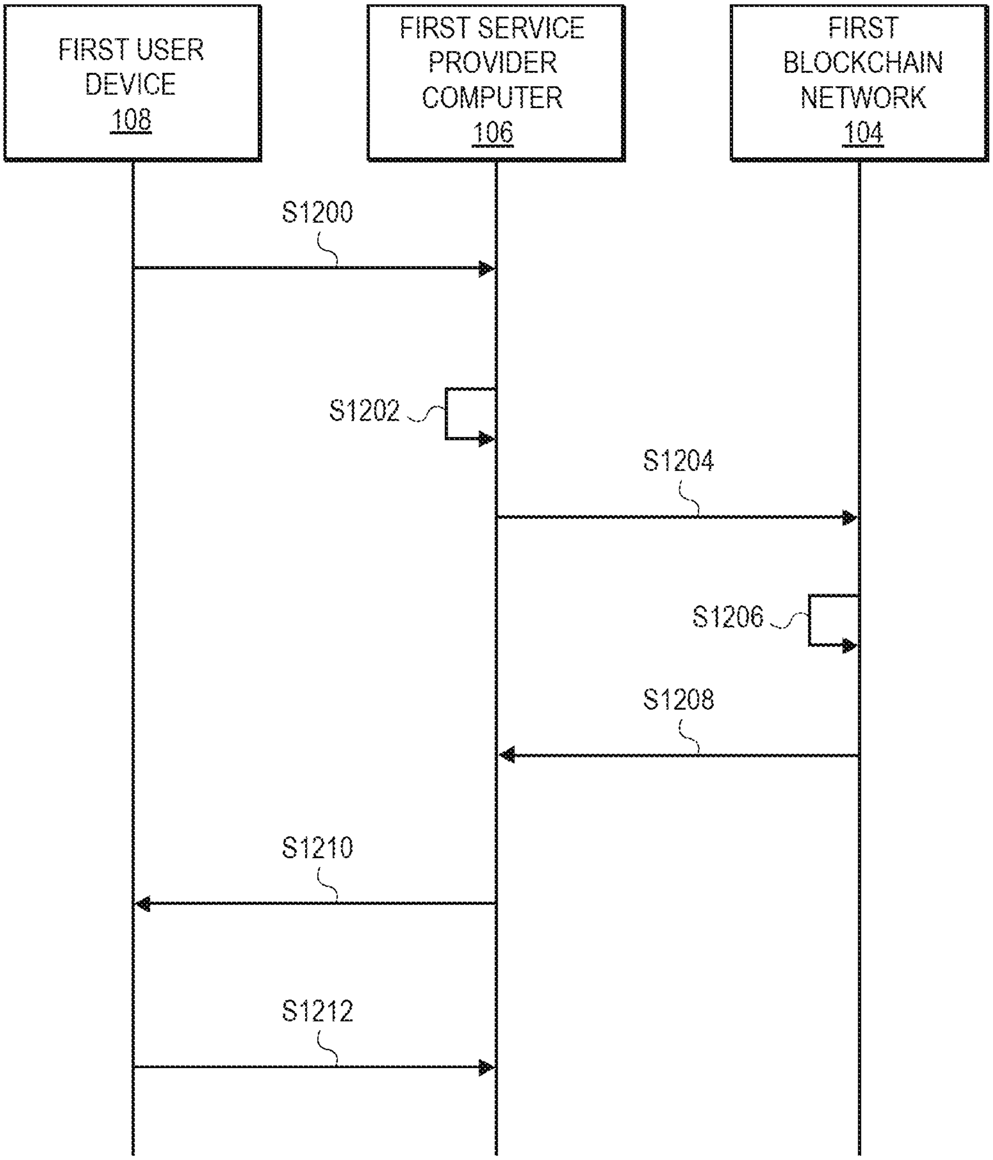
FIG. 12 shows a flow diagram for a channel close protocol according to embodiments.

FIG. 12 shows a flowchart for a channel close protocol according to embodiments. The channel close protocol can be performed after a transfer protocol. The channel close protocol may be used to complete an interaction on-chain. The channel close protocol updates a blockchain with digital currency interactions performed off-chain.

At step S1200, the first user device 108 may transmit a channel close request to the first service provider computer 106. The channel close request may comprise a first interaction channel identifier. For example, after performing the transfer protocol of FIG. 11, the first user device 108 may transmit the first interaction channel identifier to the first service provider computer 106 to request closing of the first interaction channel (e.g., to change an active status of the first smart contract to a closed status).

At step S1202, after receiving the channel close request from the first user device 108, the first service provider computer 106 may initiate closing of the first interaction channel. For example, the first service provider computer 106 may determine if there are any remaining promises in list of promises of the first smart contract. If the first service provider computer 106 finds a promise in the list of promises of the first smart contract that do not include an underlying secret of a hash, the first service provider computer 106 may invoke the claim protocol of the first smart contract using the promise as input. Otherwise, if the first service provider computer 106 finds a receipt in the list of receipts of the first smart contract, the first service provider computer 106 may invoke the claim protocol of the first smart contract using the receipt as input. If both the list of receipts of the first smart contract and the list of promises of the first smart contract are empty, the first service provider computer 106 may invoke the initialize close function of the first smart contract.

At step S1204, the first service provider computer 106 may invoke the claim protocol using the promise or the receipt, or invoke the initialize close function. Either the claim protocol or the initialize close function may transmit a request to the first blockchain network 104 to close the first interaction channel.

At step S1206, after receiving a close request from the first service provider computer 106, the first blockchain network 104 may execute the call received. For example, if the first service provider computer 106 invoked the claim protocol using a server receipt, the first blockchain network 104 may perform the functions of the claim protocol of the smart contract 200 described in FIG. 2. In such an example, the first parameters of the first smart contract included in the server receipt can be used as input to the claim protocol. For example, the first parameters of the first smart contract can include a local state of the first smart contract. The channel identifier, the index, the client credit variable, the interaction amount, hash, interaction expiry time, etc., can be retrieved from the local state of the first smart contract. The claim protocol may result in a final credit variable of the smart contract being set. For example, the final credit variable for the first user may be equal to (1000 USDC deposit)−(500 client credit+10 USDC interaction amount)=490 USDC. The claim protocol can end by invoking the initialize close function. The initialize close function may update the status of the interaction channel based on the caller of the function. For example, the status of the interaction channel may be updated to equal one of "UnilateralClosing" or "CooperativeClosing." In this example, because the request was originated by the first service provider computer 106, the caller of the function is the first service provider computer 106.

At step S1208, after invoking the initialize close function, the first blockchain network 104 may transmit the status of the interaction channel to the first service provider computer 106.

At step S1210, after receiving the status of the interaction channel from the first blockchain network 104, the first service provider computer 106 may transmit the status of the interaction channel to the first user device 108.

At step S1212, after receiving the status of the universal interaction channel from the first service provider computer 106, the first user device 108 may transmit instructions to the first service provider computer 106 to invoke a withdraw function of the first smart contract (e.g., the withdraw function of the smart contract 200). The withdraw function may return an amount of first digital currency to the on-chain first user's account of the first user identified by the first user account identifier equal to the final credit variable. For example, the withdraw function may return 490 USDC of an initial 1000 USDC deposit to the first user's account on the first blockchain network 104.

Figure 13:
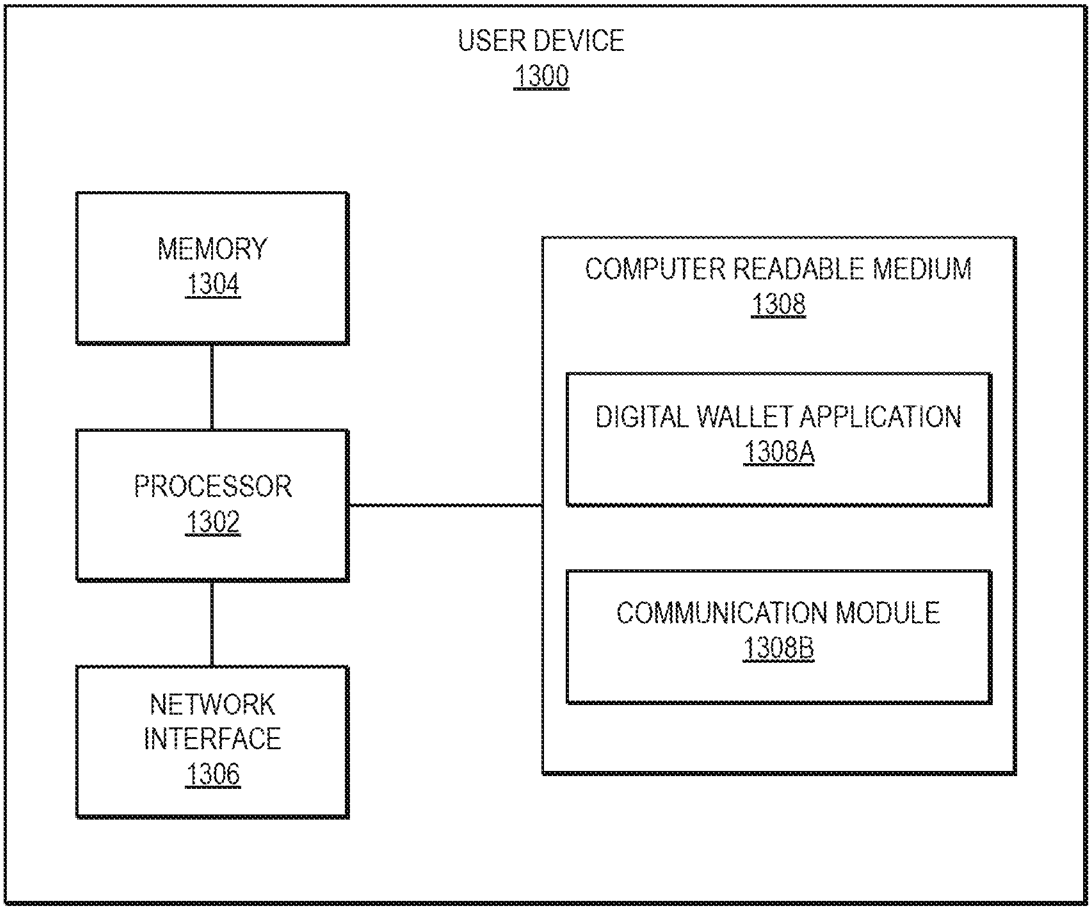
FIG. 13 shows a block diagram of an exemplary user device according to embodiments.

FIG. 13 shows a block diagram of an exemplary user device 1300 according to embodiments. The user device 1300 may comprise a processor 1302, which may be coupled to a memory 1304, a network interface 1306, and a computer readable medium 1308. Examples of the user device 1300 may be a first user device, or a second user device.

The memory 1304 may contain data of smart contracts and interaction channels, etc. The memory 1304 may be coupled to the processor 1302 internally or externally (e.g., via cloud-based data storage), and may comprise any combination of volatile and/or non-volatile memory such as RAM, DRAM, ROM, flash, or any other suitable memory device.

The network interface 1306 may include an interface that can allow the user device 1300 to communicate with external computers and/or devices. The network interface 1306 may enable the user device 1300 to communicate data to and from another device such as a hub computer, a service provider computer, other user devices, etc. Some examples of the network interface 1306 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 1306 may include Wi-Fi. Data transferred via the network interface 1306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 1306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 1308 may comprise a number of software modules including, but not limited to, a digital wallet application 1308A, and a communication module 1308B.

The digital wallet application 1308A may comprise code that causes the processor 1302 to maintain a digital wallet application on the user device 1300. For example, the digital wallet application 1308A may be used to communicate with a service provider computer that runs a digital wallet application server. The digital wallet application 1308A may allow the user to communicate with a hub computer via the service provider computer through a interaction channel.

The communication module 1308B may comprise code that causes the processor 1302 to generate messages, forward messages, reformat messages, and/or otherwise communicate with other entities.

Figure 14:
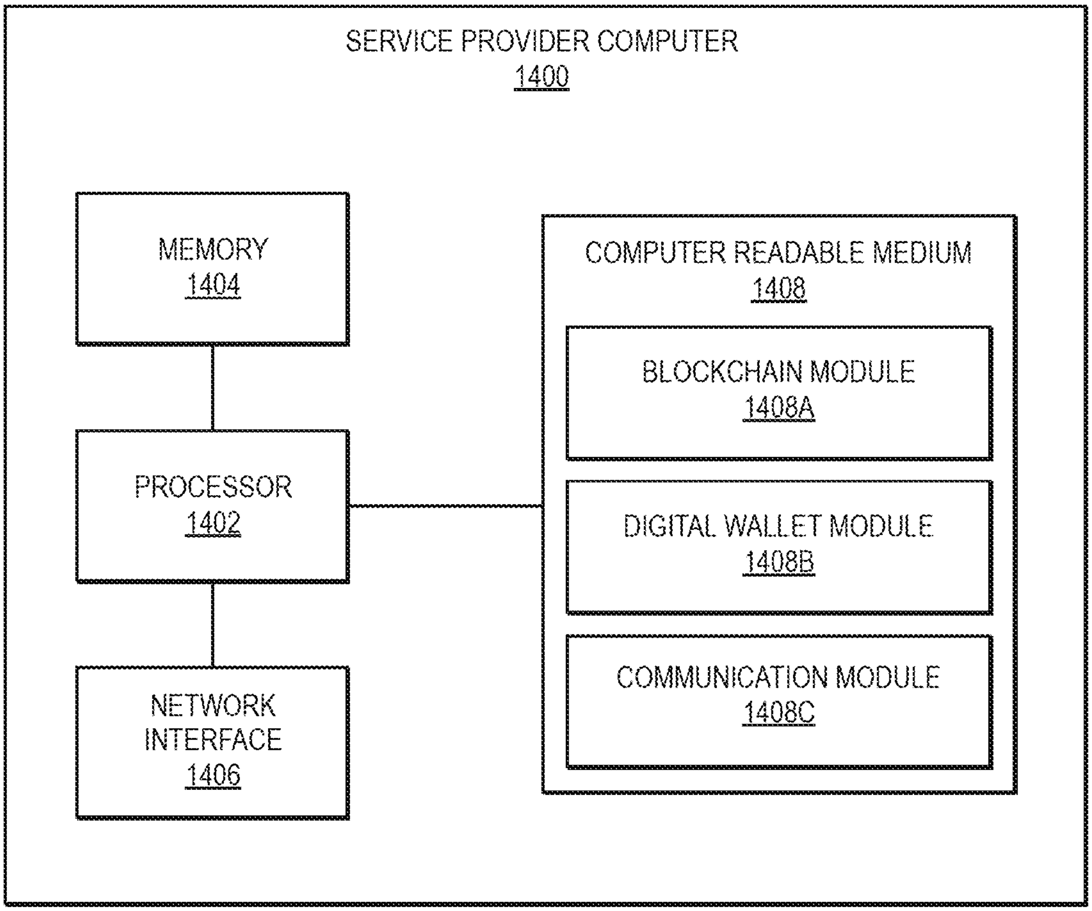
FIG. 14 shows a block diagram of an exemplary service provider computer according to embodiments.

FIG. 14 shows a block diagram of an exemplary service provider computer 1400 according to embodiments. The service provider computer 1400 may comprise a processor 1402, which may be coupled to a memory 1404, a network interface 1406, and a computer readable medium 1408. Examples of the service provider computer 1400 may be a first service provider computer, or a second service provider computer.

The memory 1404 and the network interface 1406 may have the same or different features to the previously described memory 1304 and network interface 1306.

The computer readable medium 1408 may comprise code, executable by the processor 1402, for a method comprising: generating, by a first service provider computer, a sender promise comprising a first amount of a first digital currency and first parameters, wherein the first parameters include a hashed secret of an interaction proposal; transmitting, by the first service provider computer to a hub computer through a first interaction channel, the sender promise, wherein the hub computer thereafter generates a server promise comprising a second amount of a second digital currency and transmit the server promise to a second service provider computer; receiving, by the first service provider computer from the hub computer, the secret of the hashed secret, wherein the first user device verifies the secret by hashing the secret and comparing the hashed secret to the previously received hashed secret; generating, by the first service provider computer, a server receipt comprising first parameters of the first smart contract; and transmitting, by the first service provider computer to the hub computer, the server receipt.

The computer readable medium 1408 may comprise a number of software modules including, but not limited to, a blockchain module 1408A, a digital wallet module 1408B, and a communication module 1408C.

The blockchain module 1408A may comprise code that causes the processor 1402 to communicate with blockchain networks. For example, the blockchain module 1408A may store public/private key pairs used to communicate with a blockchain network. The blockchain module 1408A may establish communicate channels, such as collateral channels and interaction channels on blockchains. The blockchain module 1408A may allow the processor 1402 to transfer digital currencies on-chain and off-chain.

The digital wallet module 1408B may comprise code that causes the processor 1402 to maintain a digital wallet application server. For example, the digital wallet module 1408B may be used to communicate with a plurality of user devices running a digital wallet application. The digital wallet module 1408B may allow the service provider computer 1400 to communicate with a user device and a hub computer.

The communication module 1408C may comprise code that causes the processor 1402 to generate messages, forward messages, reformat messages, and/or otherwise communicate with other entities.

Figure 15:
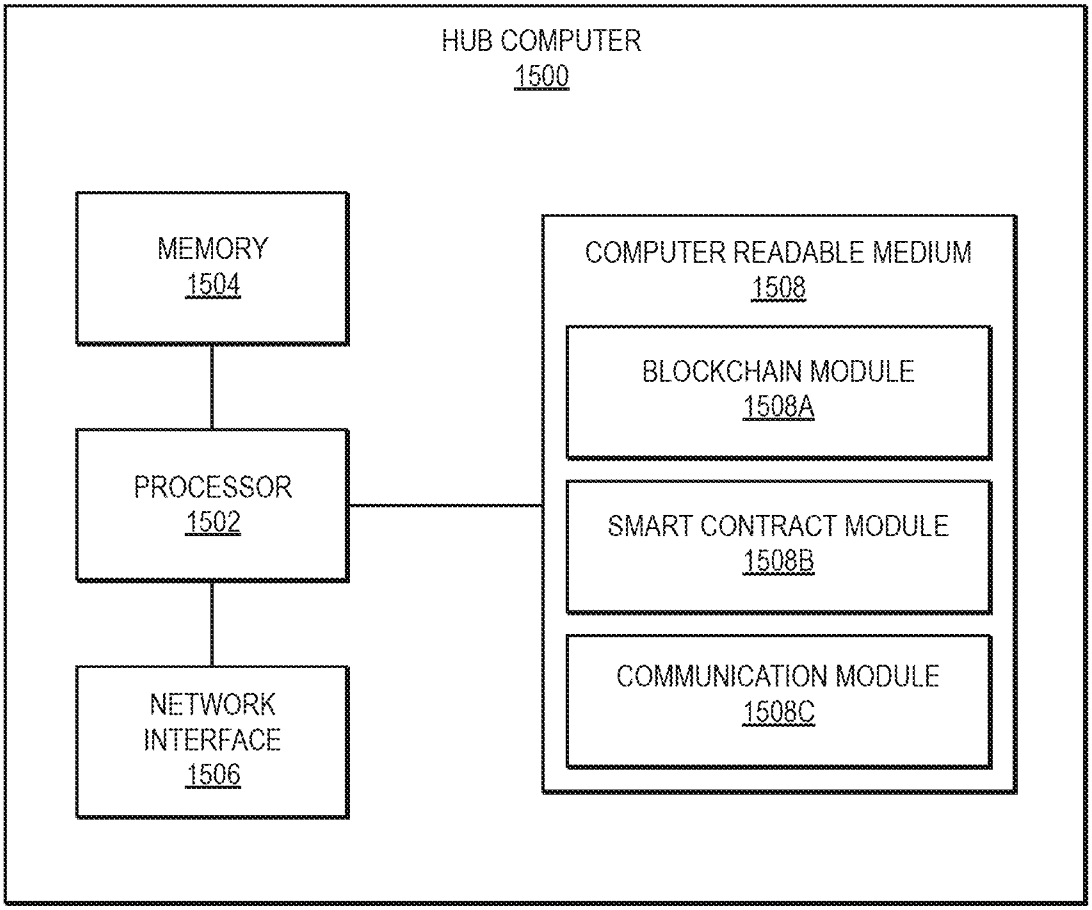
FIG. 15 shows a block diagram of an exemplary hub computer according to embodiments.

FIG. 15 shows a block diagram of an exemplary hub computer 1500 according to embodiments. The hub computer 1500 may comprise a processor 1502, which may be coupled to a memory 1504, a network interface 1506, and a computer readable medium 1508.

The memory 1504 and the network interface 1506 may have the same or different features to the previously described memory 1304 and network interface 1306.

The computer readable medium 1508 may comprise code, executable by the processor 1502, for a method comprising: receiving, by a hub computer, a first user account identifier from a first service provider computer in communication with a first user device, and in communication with a first blockchain network, the first service provider computer thereafter transferring an amount of a first digital currency to a first smart contract on the first blockchain network; receiving, by the hub computer, a second user account identifier from a second service provider computer in communication with a second user device, and also a second blockchain network containing a second smart contract, wherein the hub computer is separately in communication with the first blockchain network and the second blockchain network, and the hub computer is in communication with the first service provider computer via a first interaction channel and the hub computer is in communication with the second service provider computer via a second interaction channel; receiving, by the hub computer, a first amount of the first digital currency from the first service provider computer via the first interaction channel; and transferring, by the hub computer, a second amount of a second digital currency to the second service provider computer via the second interaction channel.

The computer readable medium 1508 may comprise a number of software modules including, but not limited to, a blockchain module 1508A, a smart contract module 1508B, and a communication module 1508C.

The blockchain module 1508A may comprise code that causes the processor 1502 to communicate with blockchain networks. For example, the blockchain module 1508A may store public/private key pairs used to communicate with a blockchain network. The blockchain module 1508A may establish communicate channels, such as collateral channels and interaction channels on blockchains. The blockchain module 1508A may allow the processor 1502 to transfer digital currencies on-chain and off-chain. The blockchain module 1508A may allow the hub computer 1500 to facilitate cross-chain interactions.

The smart contract module 1508B may comprise code that causes the processor 1502 to deploy and maintain smart contracts to blockchains. For example, the smart contract module 1508B may store a smart contract in the memory 1504 that can be deployed to a blockchain network using the blockchain module 1508A. The smart contract module 1508B may be used to invoke functions and protocols of a smart contract.

The communication module 1408C may comprise code that causes the processor 1502 to generate messages, forward messages, reformat messages, and/or otherwise communicate with other entities.

Embodiments of the invention provide for several advantages. Embodiments allow a user to perform blockchain interactions using their user device. Standard user devices can install applications managed by service providers. The service providers may perform blockchain operations on behalf of the user device, reducing the burden of computation from the user. Embodiments provide for an off-chain and cross-chain digital currency interaction method. Embodiments deploy a smart contract to a blockchain network that implements an interaction channel between a user device via a service provider computer and a hub computer. The interaction channel can be used to transfer amounts of digital currencies to a smart contract. The transfers performed by the interaction channel need not be written to the blockchain network. Instead, a promise and receipt scheme are used, where a promise includes parameters of the smart contract at the time of a proposed transfer, and a receipt includes parameters of the smart contract after a proposed transfer is completed off-chain. The promise or the receipt can be used to write a transfer on-chain to the blockchain network. Additionally, because the hub computer connects to a first user device and a second user device separately, the hub computer can provide for cross-chain payments. The hub computer can connect to the first user device using the first smart contract on the first blockchain network and connect to the second user device using the second smart contract on the second blockchain network. The hub computer may receive a first amount of a first type of digital currency via the first interaction channel established by the first smart contract and transfer a second amount of a second type of digital currency (equivalent in value to the first amount of the first type of digital currency) to the second smart contract via the second interaction channel.

Further, as described above, the use of a secret, and a hash of the secret in the context of the promise and receipt scheme as described above allows the parties to conduct transfers involving different types of cryptocurrencies to confirm that all promises that are made have been verified and confirmed. In a system that only uses receipts, a malicious hub computer may receive first digital currency from a first user, and not transfer second digital currency to the second user. The promise/receipt scheme according to embodiments reduces the trust required, as the hub computer can only receive the first digital currency from the first user after it provides a receipt to the second user. If the first user is malicious and does not provide a receipt to the hub computer, the hub computer has access to the sender promise which can be taken to the blockchain to claim the first digital currency. A system that only uses promises would effectively require on-chain transfers. The use of the hash/secret scheme according to embodiments advantageously allows for conditional transfers.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A system comprising:

one or more processors; and one or more non-transitory computer readable media comprising instructions executable by the processor to perform operations including:

generating, by a first service provider computer, a sender promise comprising a first amount of a first digital currency, first parameters, and a digital signature of the first parameters, wherein the first parameters of the sender promise include a hashed secret of an interaction proposal, a first interaction channel identifier, and a local state of a first smart contract;

transmitting, by the first service provider computer to a hub computer through a first interaction channel, the sender promise, wherein the hub computer verifies the digital signature, generates a server promise comprising a second amount of a second digital currency, and transmits the server promise to a second service provider computer;

receiving, by the first service provider computer from the hub computer, a secret of the hashed secret;

verifying, by the first service provider computer, the secret by hashing the secret and comparing the hashed secret to a previously received hashed secret;

generating, by the first service provider computer, a server receipt comprising first parameters of the first smart contract, the first parameters of the first smart contract comprising the first interaction channel identifier and an updated local state of the first smart contract; and transmitting, by the first service provider computer to the hub computer, the server receipt, wherein the first digital currency is different from the second digital currency, and wherein the hub computer also generates a receiver receipt comprising second parameters of a second smart contract deployed on a second blockchain network and transmits the receiver receipt to the second service provider computer, and wherein the first smart contract deployed on a first blockchain network connects the first service provider computer to the hub computer without connection to a first blockchain, wherein the first smart contract is deployed on the first blockchain network in response to a request by the first service provider computer, and implements the first interaction channel between the hub computer and the first service provider computer, and wherein the second smart contract is deployed on the second blockchain network in response to a request by the second service provider computer and implements a second interaction channel between the hub computer and the second service provider computer.

2. The system of claim 1, wherein the first parameters of the first smart contract include a user account identifier, a hub identifier, or a dispute time.

3. The system of claim 1, wherein the operations further comprise:

receiving, by the first service provider computer from a first user device in communication with a second user device, the interaction proposal comprising the hashed secret.

4. The system of claim 1, wherein the first parameters of the first smart contract include a user account identifier, a hub identifier, and a dispute time.

5. The system of claim 1, wherein the operations further comprise:

closing the first interaction channel.

6. The system of claim 1, wherein the sender promise comprises an expiry time, wherein the hub computer further uses the expiry time to determine if there is sufficient time to claim the sender promise.

7. A method comprising:

transmitting, by a second service provider computer in communication with a second user device to a hub computer, a second user account identifier, wherein the second service provider computer is in communication with a second blockchain network containing a second smart contract, wherein the second smart contract is deployed on the second blockchain network in response to a request from the second service provider computer, and a second interaction channel is implemented between the hub computer and the second service provider computer, and wherein the hub computer is separately in communication with a first blockchain network comprising a first smart contract and the second blockchain network, and the hub computer is in communication with a first service provider computer via a first interaction channel and the hub computer is in communication with the second service provider computer via the second interaction channel;

receiving, by the second service provider computer from the first service provider computer, an interaction request message;

generating, by the second service provider computer, an interaction proposal comprising a second interaction channel identifier for the second interaction channel, an interaction expiry time, a first amount of a first digital currency, and a hash generated by hashing a secret known by the second service provider computer;

transmitting, by the second service provider computer to the first service provider computer, the interaction proposal comprising the second interaction channel identifier, the interaction expiry time, the first amount of the first digital currency, and the hash;

receiving, by the second service provider computer from the hub computer, a server promise comprising the first amount of the first digital currency, the hash, and a digital signature of at least the first amount of the first digital currency and the hash;

verifying, by the second service provider computer using a public key associated with the hub computer, the digital signature of at least the first amount of the first digital currency and the hash;

determining, by the second service provider computer, that an amount of a second digital currency equivalent to the amount of the first digital currency is less than a deposited amount to the second smart contract by the hub computer;

providing, by the second service provider computer to the hub computer, the secret, wherein the hub computer verifies the secret; and receiving, by the second service provider computer, a receiver receipt in response to the verification of the secret by the hub computer, wherein the first interaction channel and the second interaction channel are off-chain channels.

8. The method of claim 7, wherein the server promise further comprises a local state of the second smart contract.

9. The method of claim 7, wherein the hub computer verifies the secret by hashing the secret and comparing the hashed secret to the hash received from the hub computer.

10. The method of claim 7, wherein the receiver receipt is generated using the second interaction channel identifier and an updated local state of the second smart contract.

11. The method of claim 7, wherein the receiver receipt is generated by signing the second interaction channel identifier and an updated local state of the second smart contract with a secret key of the hub computer.

12. The method of claim 7, wherein the first smart contract and the second smart contract are associated with a plurality helper functions including one or more of a generate promise function, a verify promise function, a generate receipt function, a verify receipt function, or an update local state function.

13. The method of claim 7, wherein the first smart contract is deployed to the first blockchain network by the hub computer, and wherein the second smart contract is deployed to the second blockchain network by the hub computer.

14. The method of claim 7, wherein the second user device is a mobile phone.

15. A system comprising:

one or more processors; and one or more non-transitory computer readable media comprising instructions executable by the processor to perform operations including, transmitting, by a second service provider computer in communication with a second user device to a hub computer, a second user account identifier, wherein the second service provider computer is in communication with a second blockchain network containing a second smart contract, wherein the second smart contract is deployed on the second blockchain network in response to a request from the second service provider computer, and a second interaction channel is implemented between the hub computer and the second service provider computer, and wherein the hub computer is separately in communication with a first blockchain network comprising a first smart contract and the second blockchain network, and the hub computer is in communication with a first service provider computer via a first interaction channel and the hub computer is in communication with the second service provider computer via the second interaction channel, receiving, by the second service provider computer from the first service provider computer, an interaction request message, generating, by the second service provider computer, an interaction proposal comprising a second interaction channel identifier for the second interaction channel, an interaction expiry time, a first amount of a first digital currency, and a hash generated by hashing a secret known by the second service provider computer, transmitting, by the second service provider computer to the first service provider computer, the interaction proposal comprising the second interaction channel identifier, the interaction expiry time, the first amount of the first digital currency, and the hash, receiving, by the second service provider computer from the hub computer, a server promise comprising the first amount of the first digital currency, the hash, and a digital signature of at least the first amount of the first digital currency and the hash, verifying, by the second service provider computer using a public key associated with the hub computer, the digital signature of at least the first amount of the first digital currency and the hash, determining, by the second service provider computer, that an amount of a second digital currency equivalent to the amount of the first digital currency is less than a deposited amount to the second smart contract by the hub computer, providing, by the second service provider computer to the hub computer, the secret, wherein the hub computer verifies the secret, and receiving, by the second service provider computer, a receiver receipt in response to the verification of the secret by the hub computer, wherein the first interaction channel and the second interaction channel are off-chain channels.

16. The system of claim 15, wherein the first smart contract and the second smart contract are associated with a plurality helper functions including one or more of a generate promise function, a verify promise function, a generate receipt function, a verify receipt function, or an update local state function.

17. The system of claim 15, wherein the server promise further comprises a local state of the second smart contract.

18. The system of claim 15, wherein the hub computer verifies the secret by hashing the secret and comparing the hashed secret to the hash received from the hub computer.

19. The system of claim 15, wherein the receiver receipt was generated by signing the second interaction channel identifier and an updated local state of the second smart contract with a secret key of the hub computer.

20. The system of claim 15, wherein the server promise further comprises the interaction expiry time.

* * * * *